United States Patent [19]

Goto et al.

[11] Patent Number: 4,820,772

[45] Date of Patent: Apr. 11, 1989

[54] POLYOLEFIN COMPOSITION

[75] Inventors: Nobuo Goto; Hiroshisa Ishii; Hirokazu Nakajima, all of Ichiharashi, Japan

[73] Assignee: Chisso Corporation, Japan

[21] Appl. No.: 182,520

[22] Filed: Apr. 18, 1988

[30] Foreign Application Priority Data

| Apr. 20, 1987 | [JP] | Japan | 62-96639 |
| Apr. 20, 1987 | [JP] | Japan | 62-96640 |
| Apr. 21, 1987 | [JP] | Japan | 62-97908 |

[51] Int. Cl.$^4$ ............ C08K 5/52; C08K 5/46; C08L 23/32; C08L 23/10
[52] U.S. Cl. .................... 524/83; 525/194; 525/240; 525/195; 524/117; 524/141
[58] Field of Search ............ 525/195; 524/83, 108, 524/141, 127

[56] References Cited

U.S. PATENT DOCUMENTS

| 3,268,499 | 8/1966 | Wales | 260/93.7 |
| 3,517,086 | 6/1970 | Shirayama et al. | 260/897 |
| 4,582,878 | 4/1986 | Chiba et al. | 525/268 |
| 4,596,833 | 6/1986 | Endo et al. | 521/60 |

FOREIGN PATENT DOCUMENTS

| 2341670 | 8/1970 | Japan . |
| 58-001736 | 1/1983 | Japan . |
| 61-103944 | 5/1986 | Japan . |
| 2114581 | 8/1983 | United Kingdom . |

*Primary Examiner*—Carman J. Seccuro
*Attorney, Agent, or Firm*—Leydig, Voit & Mayer

[57] ABSTRACT

A polyolefin composition having a superior resistance to impact-whitening, luster, impact resistance, mechanical strength and stiffness, particularly, mechanical strength and stiffness is provided, which composition is obtained by (1) blending (B) a high density ethylene polymer, (C) a non-crystalline ethylene-propylene random copolymer or a non-crystalline ethylene-propylene-non-conjugated diene random copolymer and a phosphate compound expressed by the following formula (I) (hereinafter referred to as compound (a)):

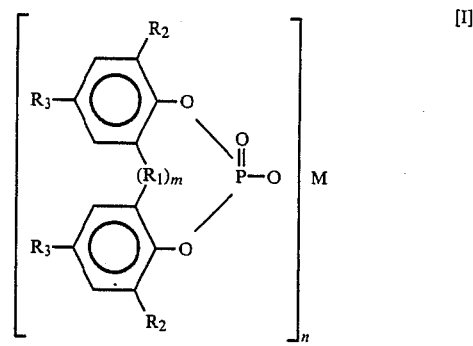

wherein $R_1$ represent sulfur or an alkylidene group of 1 to 4 carbon atoms; $R_2$ and $R_3$ each represent a hydrogen atom or the same or different alkyl groups of 1 to 8 carbon atoms; M represents a monovalent, divalent or trivalent metal atom; m represents 0 or 1; and n represents an integer of 1 to 3, with (A) a crystalline α-olefin-propylene random copolymer, in specified proportions, respectively; or (2) blending the components (B), (C) and (D) a crystalline propylene homopolymer and the compound (a) with the component (A), in specified proportions, respectively; or (3) blending the components (B) and (C) and the compound (a) with the component (A) and (E) a crystalline propylene homopolymer having a specified isotactic pentad ratio, in specified proportions, respectively.

9 Claims, No Drawings

POLYOLEFIN COMPOSITION

BACKGROUND OF THE INVENTION

1. Field of the Invention

This invention relates to a polyolefin composition. More particularly it relates to a polyolefin composition capable of affording a molded product having a superior resistance to impact-whitening, luster, impact resistance, mechanical strength and stiffness.

2. Description of the Related Art

Propylene polymers generally have superior processability, chemical resistance, electric properties and mechanical properties so that they have been processed into injection-molded product, blow-molded product, film, sheet, fibers, etc. and used for various applications. However, these properties, particularly impact resistance, cannot often be said to be sufficient in various concrete applications; thus there has been raised a problem that it is difficult to use the polymers for molded products to be subjected to mechanical impact or molded products to be used at low temperatures. In general, the stiffness and impact resistance of plastic materials stand in an inconsistent relation to each other. Thus it is very often difficult to improve the former and the latter at the same time. As to improvement in the impact resistance of propylene polymers, various processes have been proposed. For example, a process of blending a low density polyethylene, a high density polyethylene, a non-crystalline ethylene-propylene random copolymer or the like with propylene polymers, followed by subjecting the blend to a melt-kneading treatment and a process of block-copolymerizing propylene with ethylene have been well known. However, ethylene-propylene block copolymers have a notably improved impact resistance as compared with propylene homopolymers, but on the other hand, when the copolymers are subjected to impact by stress, there is a problem that the part onto which the stress has been concentrated becomes white-turbid, that is, it whitens so that the commodity value of molded products obtained therefrom is notably damaged.

Thus, in order to improve the impact resistance and resistance to impact-whitening of propylene polymers, polyolefin compositions obtained by blending a high density polyethylene and a non-crystalline ethylene-propylene random copolymer each in a specified quantity with a propylene polymer (see Japanese patent publication No. Sho 39-18746/1964, Japanese patent publication No. Sho 47-26369/1972, Japanese patent application laid-open No. Sho 48-71478/1973, Japanese patent publication No. Sho 49-15044/1974, Japanese patent application laid-open No. Sho 49-99351/1974 Japanese patent application laid-open No. Sho 53-42234/1978, Japanese patent application laid-open No. Sho 54-41950/1979, Japanese patent application laid-open No. Sho 56-163137/1981, Japanese patent application laid-open No. Sho 58-185634/1983, Japanese patent application laid-open No. Sho 58-208337/1983 and Japanese patent application laid-open No. Sho 60-112844/1985), and in order to improve the impact resistance, resistance to impact-whitening and stiffness of propylene polymers, polyolefin compositions obtained by adding at least one kind of nucleating agents selected from aromatic sulfonic acid compounds and organic carboxylic acid compounds to a ternary component mixture consisting of a propylene polymer, a high density polyethylene and an amorphous ethylene-propylene copolymer (see Japanese patent publication No. Sho 45-23416/1970) have so far been proposed. Further, in order to make the crystallization temperature of propylene polymers close to their melting points, a polyolefin composition has been proposed which is obtained by blending a high density polyethylene or a non-crystalline ethylene-propylene random copolymer with one or two kinds selected from propylene homopolymer, crystalline α-olefin-propylene random copolymers and crystalline ethylene-propylene block copolymers and having a sodium organophosphate contained in the resulting blend (see Japanese patent application laid-open No. Sho 61-103944/1986).

However, in the case of the above polyolefin compositions obtained by blending a high density polyethylene and a non-crystalline ethylene-propylene random copolymer each in a specified quantity with a propylene polymer, proposed in the above Japanese patent publication Nos. Sho 39-18746/1964 and Sho 47-26369/1972, Japanese patent application laid-open No. Sho 48-71478/1973, Japanese patent publication No. Sho 49-15044/1974, Japanese patent application laid-open Nos. Sho 49-99351/1974, Sho 53-42234/1978, Sho 54-41950/1979, Sho 56-163137/1981, Sho 58-185634/1983, Sho 58-208337/1983 and Sho 60-112844/1985, the impact resistance and resistance to impact-whitening of the compositions have been considerably improved, but the stiffness thereof is still not satisfactory. Further, in the case of polyolefin compositions obtained by adding at least one kind of nucleating agent selected from aromatic sulfonic acid compounds and organic carboxylic acid compounds to a ternary component mixture consisting of a propylene polymer, a high density polyethylene and an amorphous ethylene-propylene copolymer, proposed in the above Japanese patent publication No. Sho 45-23416/1970, the impact resistance and resistance to impact-whitening of the compositions have been considerably improved as in the above case and the improvement effect in the stiffness has been observed to a certain extent, but is still not satisfactory. Further, in the case of the above polyolefin composition obtained by blending a high density polyethylene or a non-crystalline ethylene-propylene random copolymer with at least one kind selected from propylene homopolymer, crystalline α-olefin propylene random copolymers and crystalline ethylenepropylene block copolymers, and having a sodium organophosphate contained in the resulting blend, proposed in the above Japanese patent application laid-open No. Sho 61-103944/1986, the improvement effect of the stiffness of the composition has been considerably observed due to the blending of the sodium organophosphate, but it has been impossible to satisfy the three properties of impact resistance, resistance to impact-whitening and stiffness at the same time. Further, the just above Japanese patent application laid-open No. Sho 61-103944/1986 does not disclose at all a polyolefin composition obtained by blending a high density polyethylene and a non-crystalline ethylene-propylene random copolymer with propylene homopolymer, a crystalline α-olefin-propylene random copolymer or a crystalline ethylene-propylene block copolymer as main components and further having a sodium organophosphate contained in the resulting blend, and there is no disclosure therein suggesting that it is possible for the above polyolefin composition to improve at the same time the three properties of impact resistance, resistance to impact-whitening and stiffness.

The present inventors have made extensive research in order to solve the above-mentioned problems relative to the above polyolefin compositions, and as a result have found that the following compositions can solve the above problems:

① a composition obtained by blending a high density ethylene polymer, a non-crystalline ethylene-propylene random copolymer or a non-crystalline ethylene-propylene-non-conjugated diene random copolymer and a phosphate compound expressed by the following formula (I) (hereinafter referred to as "compound (a)"):

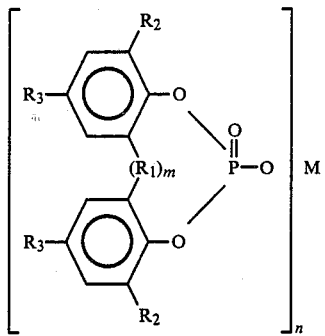

[I]

wherein $R_1$ represents sulfur or an alkylidene group of 1 to 4 carbon atoms; $R_2$ and $R_3$ each represent a hydrogen atom or the same or different alkyl groups of 1 to 8 carbon atoms; M represents a monovalent, divalent or trivalent metal atom; m represents 0 or 1; and n represents an integer of 1 to 3, with a crystalline α-olefin-propylene random copolymer, in specified proportions, respectively;

② a composition obtained by blending a high density ethylene polymer, a non-crystalline ethylene-propylene random copolymer or a non-crystalline ethylene-propylene-non-conjugated diene random copolymer and the above compound (a), with a crystalline α-olefin-propylene random copolymer and a propylene homopolymer, in specified proportions, respectively; and (3) a composition obtained by blending a high density ethylene polymer, a non-crystalline ethylene-propylene random copolymer or a non-crystalline ethylene-propylene-non-conjugated diene random copolymer and the above compound (a), with a crystalline α-olefin-propylene random copolymer and a crystalline propylene homopolymer having a specified isotactic pentad ratio, in specified proportions, respectively; these compositions further being able to afford molded products having superior luster and mechanical strength.

SUMMARY OF THE INVENTION

As apparent from the foregoing, the object of the present invention is to provide a polyolefin composition capable of affording molded products having luster, impact resistance, mechanical strength, stiffness, and a superior resistance to impact-whitening.

The present invention has the following three main aspects:

(1) a polyolefin composition comprising (A) 65 to 98 parts by weight of a crystalline α-olefin-propylene random copolymer, (B) 1 to 15 parts by weight of a high density ethylene polymer and (C) 1 to 20 parts by weight of a non-crystalline ethylene-propylene random copolymer or a non-crystalline ethylene-propylene-non-conjugated diene random copolymer, the total weight of the components (A), (B) and (C) being 100 parts by weight, having blended with said components (A), (B) and (C), 0.01 to 1 part by weight of a phosphate compound expressed by the following formula (I) (abbreviated to compound (a)):

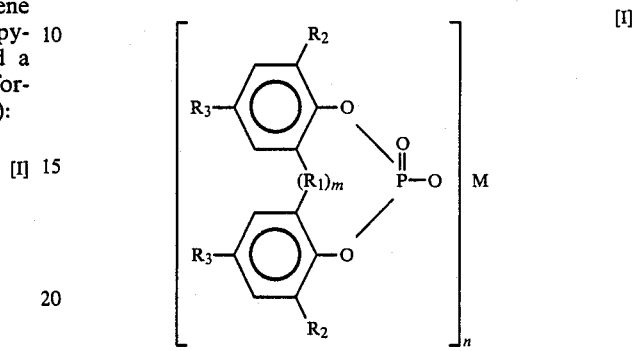

[I]

wherein $R_1$ represents sulfur or an alkylidene group of 1 to 4 carbon atoms; $R_2$ and $R_3$ each represent a hydrogen atom or the same or different alkyl groups of 1 to 8 carbon atoms; M represents a monovalent, divalent or trivalent metal atom; m represents 0 or 1; and n represents an integer of 1 to 3;

(2) a polyolefin composition comprising (A) 35 to 97 parts by weight of a crystalline α-olefin-propylene random copolymer, (D) 1 to 30 parts by weight of a propylene homopolymer, (B) 1 to 15 parts by weight of a high density ethylene polymer and (C) 1 to 20 parts by weight of a non-crystalline ethylene-propylene random copolymer or a non-crystalline ethylene-propylene-non-conjugated diene random copolymer, the total weight of the components (A), (D), (B) and (C) being 100 parts by weight, having blended with said components (A), (D), (B) and (C), 0.01 to 1 part by weight of the above-mentioned compound (a); and (3) a polyolefin composition comprising (A) 35 to 97 parts by weight of a crystalline α-olefin-propylene random copolymer, (E) 1 to 30 parts by weight of a crystalline propylene homopolymer having a relation between an isotactic pentad ratio (P) and a melt flow rate (MFR: a quantity of molten resin extruded at 230° C. under a load of 2.16 Kg and for 10 minutes), of $1.00 \geq P \geq 0.015 \log MFR + 0.955$, (B) 1 to 15 parts by weight of a high density ethylene polymer and (C) 1 to 20 parts by weight of a non-crystalline ethylene-propylene random copolymer or a non-crystalline ethylene-propylene-non-conjugated diene copolymer, the total weight of the components (A), (E), (B) and (C) being 100 parts by weight, having blended with said components (A), (E), (B) and (C), 0.01 to 1 part by weight of the above-mentioned compound (a).

DETAILED DESCRIPTION OF PREFERRED EMBODIMENTS

The crystalline α-olefin-propylene random copolymer as a component (A) used in the above first, second and third main aspects of the present invention refers to a crystalline random copolymer of propylene with at least one kind of α-olefin of 2 to 8 carbon atoms excluding 3 carbon atoms, preferably a crystalline ethylenepropylene random copolymer, a crystalline ethylene-propylene-butene-1 random copolymer and a crystalline propylene-butene-1 random copolymer. The content of the α-olefin is preferably in the range of 1 to 10% by weight. Further, the melt flow rate (MFR; a quantity of molten resin extruded at 230° C. under a load of 2.16 Kg and for 10 minutes) is usually in the range of 0.01 to 100 g/10 min., preferably 0.1 to 50 g/10 min.

Further, the high density ethylene polymer as a component (B) used in the first, second and third aspects of the present invention refers to an ethylene homopolymer or a copolymer of ethylene with at least one kind of α-olefin of 3 to 8 carbon atoms and its density is preferably in the range of 0.940 to 0.975 g/cm$^3$. Further, the melt index (MI: a quantity of molten resin extruded at 190° C. under a load of 2.16 Kg and for 10 minutes) is usually in the range of 0.01 to 100 g/10 min., preferably 0.1 to 50 g/10 min.

Further, the non-crystalline ethylene-propylene random copolymer or non-crystalline ethylene-propylene-non-conjugated diene random copolymer as a component (C) used in the first, second and third aspects of the present invention refers to a non-crystalline random copolymer having a propylene content of 20 to 60% by weight, preferably 20 to 50% by weight and a Mooney viscosity of $ML_{1+4}$ (100° C.) of 10 to 140, preferably 20 to 120. Further, in the case of the non-crystalline ethylene-propylene-non-conjugated random copolymer, those having an iodine value of 20 or less are preferred.

Further, the propylene homopolymer as the component (D) used in the second aspect of the present invention refers to a propylene homopolymer having a melt flow rate (MFR) usually of 0.01 to 100 g/10 min., preferably 0.1 to 50 g/10 min.

Further, the propylene homopolymer as a component (E) used in the third aspect of the present invention refers to a crystalline propylene homopolymer having a relation between its isotactic pentad ratio (P) and melt flow rate (MFR) of $1.00 \geq P \geq 0.0151 \log MFR + 0.955$. Such a propylene homopolymer may be prepared according to a process disclosed in Japanese patent application laid-open No. Sho 58-104907/1983 filed by the same applicants as those of the present application.

Namely, an organoaluminum compound (i) such as triethylaluminum, diethylaluminum monochloride, etc. or a reaction product (vi) of an organoaluminum compound (i) with an electron donor such as diisoamyl ether, ethylene glycol monomethyl ether, etc. is reacted with $TiCl_4$ to obtain a solid product (ii), which is then reacted with an electron donor and an electron acceptor such as anhydrous aluminum chloride, $TiCl_4$, $VCl_4$, etc. to obtain a solid product (iii), which is then combined with an organoaluminum compound (iv) such as triethylaluminum, diethylaluminum monochloride and an aromatic carboxylic acid ester (v) such as ethyl benzoate, methyl p-toluylate, ethyl p-toluylate, 2-ethylhexyl p-toluylate, etc., so as to give a molar ratio of the aromatic carboxylic acid ester (v) to the solid product (iii) of 0.1 to 10.0 to prepare a catalyst, followed by polymerizing propylene in the presence of this catalyst at one stage or more. In this case, the one stage refers to one division of a continuous or temporary feed of the monomer. The isotactic pentad ratio (P) referred to herein means the one measured according to a method described in Macromolecules, Vol.6, No. 6, November-December, 925-926 (1973), that is, an isotactic ratio in terms of the proportion of pentad units in the molecular chain of a propylene polymer, measured by using $^{13}C$-NMR. In other words, the ratio means a ratio of five propylene monomer units which are isotactically and continuously linked. The method for determining the attribution of the peak of the spectra in the measurement using $^{13}C$-NMR has been conducted based on the description in Macromolecules, Vol.8, No. 5, September-October, 687-689 (1975). In addition, the measurement using $^{13}C$-NMR in Examples mentioned later, was carried out employing an apparatus of 270 MHz of FT-NMR and by improving the signal detection limit up to 0.001 in terms of the isotactic pentad ratio through integral measurements of 27,000 times. As to the requirement of the relationship between the isotactic pentad ratio (P) and melt flow rate (MFR), since the ratio P of propylene homopolymer having a low MFR generally lowers, it has been rendered a constitution requirement for the propylene homopolymer to be used, to limit the lower limit value of the P corresponding to the MFR. Since the P refers to a ratio, its upper limit is 1.00. Further, the melt flow rate (MFR) is usually in the range of 0.01 to 100 g/10 min., preferably 0.1 to 50 g/10 min.

In the first aspect of the present invention, as to the blending proportions of the respective components, that of component (A) is in the range of 65 to 98 parts by weight, preferably 75 to 94 parts by weight, that of component (B) is in the range of 1 to 15 parts by weight, preferably 3 to 10 parts by weight and that of component (C) is in the range of 1 to 20 parts by weight, preferably 3 to 15 parts by weight, and the blending is carried out so as to give 100 parts by weight in the total weight of the respective components (A), (B) and (C).

In the second aspect of the present invention, as to the blending proportions of the respective components, that of component (A) is in the range of 35 to 97 parts by weight, preferably 55 to 89 parts by weight, that of the component (D) is in the range of 1 to 30 parts by weight, preferably 5 to 20 parts by weight, that of component (B) is in the range of 1 to 15 parts by weight, preferably 3 to 10 parts by weight and that of component (C) is in the range of 1 to 20 parts by weight, preferably 3 to 15 parts by weight, and the blending is carried out so as to give 100 parts by weight in the total weight of the respective components (A), (D), (B) and (C).

In the third aspect of the present invention, as to the blending proportions of the respective components, that of component (A) is in the range of 35 to 97 parts by weight, preferably 55 to 89 parts by weight, that of component (E) is in the range of 1 to 30 parts by weight, preferably 5 to 20 parts by weight, that of component (B) is in the range of 1 to 15 parts by weight, preferably 3 to 10 parts by weight and that of component (C) is in the range of 1 to 20 parts by weight, preferably 3 to 15 parts by weight and the blending is carried out so as to give 100 parts by weight in the total weight of components (A), (B), (C) and (E).

Examples of the compound (a) used in the present invention are sodium 2,2'-methylene-bis(4,6-di-t-butylphenyl)phosphate, sodium 2,2'-ethylidene-bis(4,6-di-t-butylphenyl)phosphate, lithium 2,2'-methylene-bis(4,6-di-t-butylphenyl)phosphate, lithium 2,2'-ethylidene-bis(4,6-di-t-butylphenyl)phosphate, sodium 2,2'-ethylidene-bis(4-i-propyl-6-t-butylphenyl)phosphate, lithium 2,2'-methylene-bis(4-methyl-6-t-butylphenyl)phosphate, lithium-2,2'-methylene-bis(4-ethyl-6-t-butylphenyl)phosphate, calcium bis[2,2'-thiobis (4-methyl-6-t-butylphenyl)phosphate], calcium bis[2,2'-thiobis(4- ethyl-6-t-butylphenyl)phosphate], calcium bis[2,2'-thiobis(4,6-di-t-butylphenyl)phosphate], magnesium bis0[2,2'-thiobis(4,6-di-t-butylphenyl)phosphate], magnesium bis[2,2'-thiobis(4-t-octylphenyl)phosphate], sodium 2,2'-butylidene-bis(4,6-dimethylphenyl)phosphate, sodium 2,2'-butylidene-bis(4,6-di-t-butylphenyl)phosphate, sodium 2,2'-t-octylmethylene-bis(4,6-dimethylphenyl)phosphate, sodium 2,2'-t-octylmethylene-bis(4,6-t-butylphenyl)phosphate, calcium bis[2,2'-methylene-bis(4,6-di-t-butylphenyl)phosphate], magnesium bis[2,2'-methylene-bis(4,6-di-t-butylphenyl)phosphate], barium bis[2,2'-methylene-bis(4,6-di-t-butylphenyl)phosphate], sodium 2,2'-methylene-bis(4-methyl-6-t-butylphenyl)phosphate, sodium 2,2'-methylene-bis(4-ethyl-6-t-butylphenyl)phosphate, sodium (4,4'-dimethyl-6,6'-di-t-butyl-2,2'-biphenyl)phosphate, calcium bis[(4,4'-dimethyl-6,6'-di-t-butyl-2,2'-biphenyl)phosphate], sodium 2,2'-ethylidene-bis(4-S-butyl-6-t-butylphenyl)phosphate, sodium 2,2'-methylene-bis(4,6-dimethylphenyl)phosphate, sodium 2,2'-methylene-bis(4,6-diethylphenyl)phosphate, potassium 2,2'-ethylidene-bis(4,6-di-t-butylphenyl)phosphate, calcium bis[2,2'-ethylidene-bis(4,6-di-t-butylphenyl)phosphate], magnesium bis[2,2'-ethylidene-bis(4,6-di-t-butylphenyl)phosphate], barium bis[2,2'-ethylidene-bis(4,6-di-t-butylphenyl)phosphate], aluminum tris[2,2'-methylene-bis (4,6-di-t-butylphenyl)phosphate], aluminum tris[2,2'-ethylidene-bis (4,6-di-t-butylphenyl)phosphate, etc. Among them, sodium 2,2'-methylene-bis(4,6-di-t-butylphenyl)phosphate is especially preferable.

As to the blending proportions of the compound (a), that in the first aspect of the present invention is in the range of 0.01 to 1 part by weight, preferably 0.05 to 0.5 part by weight based on the total weight of the components (A), (B) and (C); that in the second aspect thereof is in the range of 0.01 to 1 part by weight, preferably 0.05 to 0.5 part by weight based on the total weight of components (A), (D), (B) and (C); and that in the third aspect thereof is in the range of 0.01 to 1 part by weight, preferably 0.05 to 0.5 part by weight based on the total weight of components (A), (E), (B) and (C). If the respective blending proportions are less than 0.01 part by weight, the improved effects of stiffness, luster and mechanical strength are not sufficiently displayed, while it does not matter even if the proportions exceed 1% by weight, but more improvement of the above properties cannot be expected; hence such excess proportion is not only unpractical, but uneconomical.

Various thermoplastic synthetic resins other than the respective blending components constituting the compositions of the present invention or various synthetic rubbers other than the component (C) usually added to polyolefins may be used together with the compositions of the present invention, in the range wherein the object of the present invention is not damaged.

Examples of the former thermoplastic synthetic resins are very low density polyethylene, low density polyethylene, linear low density polyethylene, medium density polyethylene, propylene homopolymer to be used in the first and third aspects, crystalline block copolymers of propylene with at least one kind of α-olefins such as ethylene, butene-1, pentene-1, 4-methyl-pentene-1, hexene-1, octene-1, etc. polybutene, poly-4-methylpentene-1, copolymers of α-olefins with vinyl acetate, acrylic acid esters, etc. or saponified products of these copolymers, copolymers of α-olefins with unsaturated silane compounds, copolymers of α-olefins with unsaturated carboxylic acids or anhydrides thereof, reaction products of these copolymers with metallic ion compounds, modified polyolefins obtained by modifying polyolefins with unsaturated carboxylic acids or derivatives thereof, silane-modified polyolefins obtained by modifying polyolefins with unsaturated silane compounds, polystyrene, styrene-acrylonitrile copolymer, acrylonitrile-butadiene-styrene copolymer, polyamides, polyethylene terephthalate, polycarbonates, polybutylene terephthalate, polyvinyl chloride, fluorine resin, etc.

Examples of the latter synthetic rubbers other than the component (C) are polybutadiene, polyisoprene, polychloroprene, chlorinated polyethylene, chlorinated polypropylene, styrene-butadiene rubbers, acrylonitrile-butadiene rubbers, styrene-butadiene-styrene block copolymer, styrene-isoprene-styrene block copolymer, styrene-ethylene-butylene-styrene block copolymer, styrene-propylene-butylene-styrene block copolymer, etc.

Further, various kinds of additives usually added to polyolefins may be used together with the compositions of the present invention, in the range wherein achieving the object of the present invention is not precluded.

Examples of such additives are antioxidants such as phenols, thioethers, phosphorus compounds, etc., light stabilizers, clarifying agents, nucleating agents, lubricants, antistatic agents, anti-fogging agents, anti-blocking agents, anti-dropping agents, metal-deactivators (copper-deactivator), radical generators such as peroxides, dispersing agents such as metal soaps, neutralizing agents, inorganic fillers such as talc, mica, clay, wollastonite, zeolites, asbestos, calcium carbonate, aluminum hydroxide, magnesium hydroxide, silicon dioxide, titanium dioxide, zinc oxide, magnesium oxide, zinc sulfide, barium sulfate, calcium silicate, aluminum silicate, glass fiber, potassium titanate, carbon fiber, carbon black, graphite, metal fiber, the above-mentioned inorganic fillers subjected to surface treatment with coupling agents such as silane compounds, titanate compounds, boron compounds, aluminate compounds, zircoaluminate compounds, etc. or organic fillers such as wood-flour, pulp, waste-paper, synthetic fibers, natural fibers, etc.

The compositions of the present invention may be prepared by mixing the respective blending components, the above-mentioned compound (a) and the above-mentioned additives usually added to polyolefins, each in a definite quantity by means of a conventional mixer such as Henschel mixer (tradename), super mixer, ribbon blender, Banbury mixer, etc., followed by melt-kneading and pelletizing the resulting blend by means of conventional single-screw extruder, twin-screw extruder, Brabender, rolls, etc., at a melt-kneading temperature of 170° to 300° C., preferably 200° to 250° C. The resulting compositions are molded according to various molding processes such as an injection molding process, extrusion molding process, blow molding process, etc. to obtain the objective molded products.

The phosphate compounds referred to herein as compound (a) have generally been known to function as a neucleating agent to thereby improve stiffness and mechanical strength of molded product using polyolefin compositions, as disclosed in Japanese patent application laid-open No. Sho 58-1736/1983. However, it has been found that when the compound (a) is blended with 100 parts by weight in total of the respective blending components each in a specified proportion, of the present invention, then a surprising synergistic effect which cannot be anticipated at all from known blends of nucleating agent has been exhibited affording compositions from which molded products having a far superior stiffness, luster and mechanical strength are obtained.

As compared with known polyolefin compositions having various nucleating agents blended therewith, the compositions of the present invention are
  (1) far superior in the stiffness, luster and mechanical strength;
  (2) superior in resistance to impact-whitening and impact resistance; and
  (3) adequately usable for various applications where resistance to impact-whitening, luster, impact resistance, mechanical strength and stiffness are required, particularly for parts for automobiles such as battery cases, washer tanks, etc. and parts for domestic appliances such as the upper covers and middle covers of electric washing machines, housings of cleaners, etc.

The present invention will be described in more detail by way of Examples and Comparative examples, but it should not be construed to be limited thereto.

In addition, the evaluation methods employed in Examples and Comparative examples were carried out according to the following methods:

(I) Resistance to impact-whitening:
With the resulting pellets, a test piece of 50 mm long, 50 mm wide and 2 mm thick was prepared according to an injection molding process, and with this test piece, a steel ball of 500 g was dropped from a height of 100 cm so that the steel ball might collide with the central part of the test piece to generate an impact-whitened spot on the test piece. The generated whitening was classified into the following four stages to thereby evaluate the resistance to impact-whitening:
  ◎: whitened spot is scarcely observed;
  ○: whitened spot is slightly observed;
  △: whitened spot is considerably observed; and
  x: whitened spot is noticeable apparent.

(II) Luster:
With the resulting pellets, a test piece of 50 mm long, 50 mm wide and 2 mm thick was prepared according to injection molding process, and with this test piece, its percentage luster was measured according to ASTM D 523 to evaluate the luster.

(III) Impact resistance:
With the resulting pellets, a notched test piece of 63.5 mm long, 13 mm wide and 3.5 mm thick was prepared according to injection molding process, and with this test piece, an Izoid impact strength at 23° C. was measured according to JIS K 7110 to evaluate its impact resistance.

(IV) Mechanical strength:
With the resulting pellets, a test piece of 175 mm long, 10 mm wide and 3.3 mm thick according to JIS No. 1 was prepared according to injection molding process, and with this test piece, its tensile strength was measured according to JIS K 7113 to evaluate its mechanical strength.

(V) Stiffness:
With the resulting pellets, a test piece of 100 mm long, 10 mm wide and 4 mm thick was prepared according to injection molding process, and with this test piece, its flexural modulus was measured according to JIS K 7203 to evaluate its stiffness.

Preparation of component (E)
(1) Preparation of catalyst:

n-Hexane (600 ml), diethylaluminum monochloride (DEAC) (0.50 mol) and diisoamyl ether (1.20 mol) were mixed at 25° C. for one minute, followed by reacting the mixture at the same temperature for 5 minutes to obtain a reaction liquid (vi) (molar ratio of diisoamyl ether/DEAC: 2.4 . $TiCl_4$ (4.0 mols) was placed in a reactor purged with nitrogen gas, followed by heating it to 35° C., dropwise adding thereto the total quantity of the above reaction liquid (vi) over 180 minutes, keeping the mixture at the same temperature for 30 minutes, raising the temperature up to 75° C., further reacting it for one hour, cooling the resulting material down to room temperature (20° C.), removing the supernatant, four times repeating a procedure of adding n-hexane 4,000 ml) and removing the supernatant by decantation to obtain a solid product (ii) (190 g), suspending the total quantity of the solid product (ii) in n-hexane 3,000 ml), adding to the suspension, diisoamyl ether (160 g) and $TiCl_4$ (350 g) at room temperature (20° C.) over one minute, reacting the mixture at 65° C. for one hour, cooling the resulting material down to room temperature after completion of the reaction, removing the supernatant by decantation, five times repeating a procedure of adding n-hexane (4,000 ml), agitating the mixture for 10 minutes, allowing it to stand still and removing the supernatant and drying the residue under reduced pressure to obtain a solid product (iii).

(2) Preparation of preactivated catalyst:
Into a 20 l capacity stainless reactor equipped with slanted blades and purged with nitrogen gas were added n-hexane (15 l), diethylaluminum monochloride (42 g) and the solid product (iii) (30 g) at room temperature, followed by introducing hydrogen (15 Nl), reacting the mixture under a propylene partial pressure of 5 $Kg/cm^2G$ for 5 minutes and removing unreacted propylene, hydrogen and n-hexane under reduced pressure to obtain a preactivated catalyst (vii) in the form of powder (reacted propylene per g of the solid product (iii): 82.0 g).

(3) Propylene polymerization:
Into a 250 l capacity stainless polymerization vessel equipped with turbine type agitating blades and purged with nitrogen gas were fed n-hexane (100 l) and then diethylaluminum monochloride (10 g), the above preactivated catalyst (vii) (10 g) and methyl p-toluylate (11.0 g), followed by further adding hydrogen (150 Nl), raising the temperature inside the vessel up to 70° C., feeding propylene into the vessel, raising the pressure inside the vessel up to 10 $Kg/cm^2G$, continuing polymerization for 4 hours while keeping the temperature at 70° C. and the pressure at 10 $Kg/cm^2G$, thereafter feeding methanol (25 l), raising the temperature up to 80° C., after 30 minutes adding 20% NaOH aqueous solution (100 g), agitating the mixture for 20 minutes, adding purified water (50 l), discharging remaining propylene, withdrawing the aqueous layer, further adding purified water (50 l), washing the mixture with stirring for 10 minutes, withdrawing the aqueous layer, further withdrawing a propylene homopolymer-n-hexane slurry, filtering the slurry and drying the filtered material to obtain a white propylene homopolymer in the form of powder ((E)-[I]), which was analyzed. As a result, it had an MFR of 6.0 g/10 min. and an isotactic pentad ratio of 0.975.

EXAMPLES 1–11 AND COMPARATIVE EXAMPLES 1–9

An unstabilized, powdery, crystalline ethylene-propylene random copolymer having an MFR of 7.0 g/10 min. (ethylene content: 2.5% by weight; (A)-[I]) as component (A), component (B) and component (C) each shown later in Table 1, were blended so as to give blending proportions indicated later in Table 1, respectively, followed by introducing into a Henschel mixer (tradename), 100 parts by weight in total of components (A), (B) and (C) and sodium 2,2'-methylene-bis(4,6-di-t-butylphenyl)phosphate as compound (a) and other additives, in definite proportions indicated later in Table 1, respectively, mixing these with stirring for 3 minutes, subjecting the resulting blend to melt-kneading treatment by means of a single-screw extruder having a bore diameter of 40 mm at 200° C. and pelletizing it.

Further, in Comparative examples 1 to 9, an unstabilized, powdery, crystalline ethylene-propylene random copolymer having an MFR of 7.0 g/10 min. (ethylene content 2.5% by weight; (A)-[I]) as component (A), component (B), component (C) and EPB (ethylene-propylene block copolymer) in blending proportions indicated later in Table 1, respectively, were blended, followed by further blending additives indicated later in Table 1 and in proportions indicated therein, respectively, with 100 parts by weight in total of components (A), (B), (C) and EPB and subjecting the resulting blend to melt-kneading treatment as in Examples 1 to 11, to obtain pellets.

Test pieces used for tests of resistance to impact-whitening, luster, impact resistance, mechanical strength and stiffness were prepared by molding the above pellets according to injection molding process, at a resin temperature of 250° C. and a mold temperature of 50° C.

With the resulting pellets, resistance to impact-whitening, luster, impact resistance, mechanical strength and stiffness were evaluated according to the above-mentioned testing methods. The results are shown in Table 1.

EXAMPLE 12–22 AND COMPARATIVE EXAMPLES 10–18

An unstabilized, powdery, crystalline ethylene-propylene random copolymer having an MFR of 2.0 g/10 min. (ethylene content 4.5% by weight; (A)-[II]) as component (A), components (B) and (C), in blending proportions indicated later in Table 2, respectively, were blended, followed by introducing into a Henschel mixer, 100 parts by weight in total of components (A), (B) and (C), sodium 2,2'-methylene-bis(4,6-di-t-butylphenyl)phosphate as compound (a) and other additives in blending proportions indicated later in Table 2, respectively, mixing these with stirring for 3 minutes, subjecting the resulting blend to melt-kneading treatment at 200° C. by means of a single-screw extruder having a bore diameter of 40 mm and pelletizing it. Further, in Comparative examples 10 to 18, an unstabilized, powdery, crystalline ethylene-propylene random copolymer having an MFR of 2.0 g/10 min. (ethylene content 4.5% by weight; (A)-[II]) as component (A), components (B) and (C) and EPB, indicated later in Table 2 in blending proportions indicated in Table 2, were blended, followed by further blending additives indicated in Table 2, each in a definite quantity, with 100 parts by weight in total of components (A), (B) and (C) and FPB and subjecting the blend to melt-kneading treatment according to Examples 12 to 22 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above testing methods. The results are shown in Table 2.

EXAMPLES 23–33 AND COMPARATIVE EXAMPLES 19–27

An unstabilized, powdery, crystalline ethylene-propylene-butene-1 random copolymer having an MFR of 7.0 g/10 min. (ethylene content 2.5% by weight, butene-1 content 4.5% by weight; (A)-[III]), indicated later in Table 3 as component (A), along with components (B) and (C), indicated later in Table 3 in blending proportions were blended, followed by introducing into a Henschel mixer, sodium 2,2'-methylene-bis(4,6-di-t-butylphenyl)phosphate as compound (a) and other additives in blending proportions indicated later in Table 3 together with 100 parts by weight in total of components (A), (B) and (C), mixing these with stirring for 3 minutes and subjecting the blend to melt-kneading treatment at 200° C. by means of a single-screw extruder having a bore diameter of 40 mm to obtain pellets. Further, in Comparative examples 19 to 27, an unstabilized, powdery, crystalline ethylene-propylene-butene-1 random copolymer having an MFR of 7.0 g/10 min. (ethylene content 2.5% by weight, butene-1 content 4.5% by weight; (A)-[III]) as component (A), components (B) and (C) and EPB indicated in Table 3 in blending proportions indicated in Table 3 were blended, followed by further blending additives indicated in Table 3, in definite quantities, respectively, with 100 parts by weight in total of components (A), (B) and (C) and EPB and subjecting these to melt-kneading treatment as in the case of Examples 23 to 33 to obtain pellets.

Test pieces used for tests of resistance to impact-whitening, luster, impact resistance, mechanical strength and stiffness were prepared from the pellets according to injection molding, at a resin temperature of 250° C. and at a mold temperature of 50° C.

With the test pieces, resistance to impact-whitening, luster, impact resistance, mechanical strength and stiffness were evaluated. The results are shown in Table 3.

EXAMPLES 34 TO 44 AND COMPARATIVE EXAMPLES 28 TO 36

An unstabilized, powdery, crystalline ethylene-propylene-butene-1 random copolymer having an MFR of 7.0 g/10 min. (ethylene content 4.0% by weight, butene-1 content 4.5% by weight; (A)-[IV]), indicated later in Table 4 as component (A), components (B) and (C) in blending proportions indicated in Table 4 were blended, followed by further introducing into a Henschel mixer, sodium 2,2'-methylene-bis(4,6-di-t-butylphenyl)phosphate and other additives in blending proportions indicated in Table 4, respectively, together with 100 parts by weight in total of components (A), (B) and (C), mixing these with stirring for 3 minutes, and subjecting the blend to melt-kneading treatment at 200° C. by means of a single-screw extruder having a bore diameter of 40 mm to obtain pellets. Further, in Comparative examples 28 to 36, an unstabilized, powdery,- crystalline ethylene-propylene-butene-1 random copolymer having an MFR of 7.0 g/10 min. (ethylene content 4.0% by weight and butene-1 content 4.5% by weight; (A)-[IV]) as component (A), components (B) and (C) and EPB in blending proportions indicated in Table 4, respectively, were blended, followed by further blending additives indicated in Table 4 in definite quantities, respectively, together with 100 parts by weight in total of components (A), (B) and (C) and EPB, and subjecting the blend to melt-kneading treatment as in the case of Examples 34 to 44 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above methods. The results are shown in Table 4.

EXAMPLES 45 TO 55 AND COMPARATIVE EXAMPLES 37 TO 45

An unstabilized, powdery, crystalline ethylene-propylene random copolymer having an MFR of 7.0 g/10 min. (ethylene content 2.5% by weight; (A)-[I]), indicated in Table 5 as component (A), components (B), (C) and (D), in blending proportions indicated in Table 5, were blended, followed by further introducing sodium 2,2'-methylene-bis(4,6-di-t-butylphenyl)phosphate as compound (a) and other additives in blending proportions indicated in Table 5 together with 100 parts by weight in total of components (A), (B), (C) and (D), mixing these with stirring for 3 minutes and subjecting the blend to melt-kneading treatment at 200° C. by means of a single-screw extruder having a bore diameter of 40 mm, as in the case of Examples 45 to 55 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-resistance, luster, impact resistance, mechanical strength and stiffness were evaluated. The results are shown in Table 5.

EXAMPLES 56 TO 66 AND COMPARATIVE EXAMPLES 46 TO 54

An unstabilized, powdery, crystalline ethylene-propylene random copolymer having an MFR of 2.0 g/10 min. (ethylene content 4.5% by weight; (A)-[II]), indicated later in Table 6 as component (A), components (B), (C) and (D), indicated later in Table 6 in blending proportions indicated in Table 6, respectively, followed by further introducing into a Henschel mixer, sodium 2,2'-methylene-bis(4,6-di-t-butylphenyl)phosphate as a compound (a) and other additives in blending proportions indicated later in Table 6 together with 100 parts by weight in total of components (A), (B), (C) and (D), mixing these with stirring for 3 minutes and subjecting the blend to a melt-kneading treatment at 200° C. by means of a single-screw extruder having a bore diameter of 40 mm to obtain pellets. Further, in Comparative examples 46 to 54, an unstabilized, powdery, crystalline ethylene-propylene random copolymer having an MFR of 2.0 g/10 min. (ethylene content 4.5% by weight; (A)-[II]), components (B), (C) and (D) and EPB indicated later in Table 6, in blending proportions indicated in Table 6 were blended, followed by blending additives indicated in Table 6 in definite quantities, respectively, with 100 parts by weight in total of components (A), (B), (C) and (D) and EPB, and subjecting the blend to a melt-kneading treatment as in Examples 56 to 66 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated. The results are shown in Table 6.

EXAMPLES 67 TO 77 AND COMPARATIVE EXAMPLES 55 TO 63

An unstabilized, powdery, crystalline ethylene-propylene-butene-1 random copolymer having an MFR of 7.0 g/10 min. (ethylene content 2.5% by weight and butene-1 content 4.5% by weight; (A)-[III]) indicates as component (A), and components (B), (C) and (D), were blended in blending proportions indicated later in Table 7, respectively, followed by introducing into a Henschel mixer, sodium 2,2'-methylene bis(4,6-di-t-butylphenyl)phosphate as compound (a) and other additives in definite quantities in blending proportions indicated in Table 7, respectively, mixing these with stirring for 3 minutes and subjecting the blend to a melt-kneading treatment at 200° C. by means of a single-screw extruder having a bore diameter of 40 mm to obtain pellets. In Comparative examples 55 and 63, an unstabilized, powdery, crystalline ethylene-propylene-butene-1 random copolymer having an MFR of 7.0 g/10 min. (ethylene content 2.5% by weight and butene-1 content 4.5% by weight; (A)-[III]), indicated in Table 7 as component (A), components (B), (C) and (D) and EPB, were blended in blending proportions indicated in Table 7, respectively, followed by further blending additives indicated in Table 7 in definite quantites with 100 parts by weight in total of components (A), (B), (C) and (D) and EPB, and subjecting the blend to a melt-kneading treatment as in Examples 67 to 77 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above testing methods. The results are shown in Table 7.

EXAMPLES 78 TO 88 AND COMPARATIVE EXAMPLES 64 TO 72

An unstabilized, powdery, crystalline ethylene-propylene-butene-1 random copolymer having an MFR of 7.0 g/10 min. (ethylene content 4.0% by weight and butene-1 content 4.5% by weight; (A)-[IV]) indicated as component (A), components (B), (C) and (D) were blended in blending proportions indicated in Table 8, followed by further introducing into a Henschel mixer, sodium 2,2'-methylene-bis(4,6-di-t-butylphenyl)phosphate and other additives in definite quantities in blending proportions indicated in Table 8 together with 100 parts by weight in total of components (A), (B), (C) and (D), mixing these with stirring for 3 minutes, and subjecting the blend to a melt-kneading treatment at 200° C. by means of a single-screw extruder having a bore diameter of 40 mm to obtain pellets. Further, in Comparative examples 64 to 72, an unstabilized, powdery, crystalline ethylene-propylene-butene-1 random copolymer having an MFR of 7.0 g/10 min. (ethylene content 4.0% by weight and butene-1 content 4.5% by weight; (A)-[IV]) as component (A), components (B), (C) and (D) and EPB in blending proportions indicated in Table 8, respectively, were blended, followed by further blending additives indicated in Table 8 in definite quantities, respectively and subjecting the blend to a melt-kneading treatment as in Examples 78 to 88 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above testing methods. The results are shown in Table 8.

EXAMPLES 89 TO 96 AND COMPARATIVE EXAMPLES 73 TO 85

An unstabilized, powdery, crystalline ethylene-propylene random copolymer having an MFR of 7.0 g/10 min. (ethylene content 2.5% by weight; (A)-[I]), indicated in Table 9 as component (A), components (B), (C) and (E), were blended in blending proportions indicated in Table 9, respectively, followed by further introducing into a Henschel mixer, sodium 2,2'-methylene-bis(4,6-di-t-butylphenyl)phosphate as compound (a) and other additives in definite quantities in blending proportions indicated in Table 9 together with 100 parts by weight in total of components (A), (B), (C) and (E), mixing these with stirring for 3 minutes and subjecting the blend to a melt-kneading treatment at 200° C. by means of a single-screw extruder having a bore diameter of 40 mm to obtain pellets. Further, in Comparative examples 73 to 85, an unstabilized, powdery, crystalline ethylene-propylene random copolymer having an MFR of 7.0 g/10 min. (ethylene content 2.5% by weight; (A)-[I]) as component (A), components (B), (C) and (E), PP and EPB in blending proportions indicated in Table 9 were blended, followed by blending additives indicated in Table 9 in definite quantities, respectively, with 100 parts by weight in total of components (A), (B), (C) and (E), PP and EPB and subjecting the blend to a melt-kneading treatment as in Examples 89 to 96 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above testing methods. The results are shown in Table 9.

EXAMPLES 97 TO 104 AND COMPARATIVE EXAMPLES 86 TO 98

An unstabilized, powdery, crystalline ethylene-propylene random copolymer having an MFR of 2.0 g/10 min. (ethylene content 4.5% by weight; (A)-[II]), indicated in Table 10 as component (A), components (B), (C) and (E), were blended in blending proportions indicated in Table 10, followed by further introducing into a Henschel mixer, sodium 2,2'-methylene-bis(4,6-di-t-butylphenyl)phosphate as compound (a) and other additives in definite quantities in blending proportions indicated in Table 10 together with 100 parts by weight in total of components (A), (B), (C) and (E), mixing these with stirring for 3 minutes and subjecting the blend to a melt-kneading treatment at 200° C. by means of a single-screw extruder having a bore diameter of 40 mm to obtain pellets. In Comparative examples 86 to 98, an unstabilized, powdery, crystalline ethylene-propylene random copolymer having an MFR of 2.0 g/10 minutes (ethylene content 4.5% by weight; (A)-[II]) as component (A), components (B), (C) and (E), PP and EPB, indicated in Table 10, were blended in blending proportions indicated in Table 10, followed by introducing into a Henschel mixer, sodium 2,2'-methylene-bis(4,6-di-t-butylphenyl)phosphate as component (a) and other additives in definite quantites in blending proportions indicated in Table 10, respectively,.together with 100 parts by weight in total of components (A),(B), (C) and (E), PP and EPB, mixing these with stirring for 3 minutes and subjecting the blend to a melt-kneading treatment as in Examples 97 to 104 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above testing methods. The results are shown in Table 10.

EXAMPLES 105 TO 112 AND COMPARATIVE EXAMPLES 99 TO 111

An unstabilized, powdery, crystalline ethylene-propylene-butene-1 random copolymer having an MFR of 7.0 g/10 min. (ethylene content 2.5% by weight and butene-1 content 4.5% by weight; (A)-[III]), indicated in Table 11 as component (A), components (B), (C) and (E) were blended in blending proportions indicated in Table 11, respectively, followed by introducing into a Henschel mixer (tradename) sodium 2,2'-methylene-bis(4,6-di-t-butylphenyl)phosphate as compound (a) and other additives in definite quantities, respectively, in blending proportions indicated in Table 11, together with 100 parts by weight in total of components (A), (B), (C) and (E), mixing these with stirring for 3 minutes, and subjecting the blend to a melt-kneading treatment at 200° C. by means of a single-screw extruder to obtain pellets. In Comparative examples 99 to 111, an unstabilized, powdery, crystalline ethylene-propylene-butene-1 random copolymer having an MFR of 7.0 g/10 min. (ethylene content 2.5% by weight and butene-1 content 4.5% by weight; (A)-[III]), components (B), (C) and (E), PP and EPB indicated in Table 11 were blended in blending proportions indicated in Table 11, followed by further blending additives indicated in Table 11 in definite quantities, respectively, with 100 parts by weight in total of components (B), (C) and (E), PP and EPB, and subjecting the blend to a melt-kneading treatment as in Examples 105 to 112 to obtain pelles.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above testing methods. The results are shown in Table 11.

EXAMPLES 113 TO 120 AND COMPARATIVE EXAMPLES 112 TO 124

An unstabilized, powdery, crystalline ethylene-propylene-butene-1 random copolymer having an MFR of 7.0 g/10 min. (ethylene content 4.0% by weight and butene-1 content 4.5% by weight; (A)-[IV]), indicated in Table 12 as component (A), components (B), (C) and (E), were blended in blending proportions indicated in Table 12, followed by further introducing into a Henschel mixer (tradename) sodium 2,2'-methylene-bis(4,6-di-t-butylphenyl)phosphate and other additives in definite quantities, respectively, in blending proportions indicated in Table 12, mixing these with stirring for 3 minutes and subjecting the blend to a heat-kneading treatment at 200° C. by means of a single-screw extruder having a bore diameter of 40 mm to obtain pellets. In Comparative examples 112 to 124, an unstabilized, powdery, crystalline ethylene-propylene-butene-1 random copolymer having an MFR of 7.0 g/10 min. (ethylene content 4.0% by weight and butene-1 content 4.5% by weight; (A)-[IV]), components (B), (C) and (E), PP and EPB were blended in blending proportions indicated in Table 12, followed by further blending additives indicated in Table 12 in definite quantities, respectively, with 100 parts by weight in total of components (A), (B), (C) and (E) and PP and EPB and subjecting the blend to a heat-kneading treatment as in Examples 113 to 120 to obtain pellets.

Test pieces used for tests of resistance to impact-whitening, luster, impact resistance, mechanical strength and stiffness were prepared from the pellets according to injection molding at a resin temperature of 250° C. and a mold temperature of 50° C.

With the test pieces, resistance to impact-whitening, luster, impact resistance, mechanical strength and stiffness were evaluated according to the above testing methods. The results are shown in Table 12.

The components (A), (B), (C), (D) and (E), compound (a), EPB and additives used in the present invention and shown in Tables 1 to 12 are as follows:

Component (A)
(A)-[I]: a crystalline ethylene-propylene random copolymer (MFR 7.0 g/10 min., ethylene content: 2.5% by weight)
(A)-[II]: a crystalline ethylene-propylene random copolymer (MFR 2.0 g/10 min., ethylene content: 4.5% by weight)
(A)-[III]: a crystalline ethylene-propylene-butene-1 random copolymer (MFR 7.0 g/10 min., ethylene content 2.5% by weight, butene-1 content 4.5% by weight)
(A)-[IV]: a crystalline ethylene-propylene-butene-1 random copolymer (MFR 7.0 g/10 min., ethylene content 4.0% by weight, butene-1 content 4.5% by weight)

Component (B)
(B)-[I]: a Ziegler-Natta high density ethylene homopolymer (MI 5.0 g/10 min., density 0.963 g/cm$^3$)
(B)-[II]: a Ziegler-Natta high density ethylene-propylene copolymer (MI 5.0 g/10 min., density 0.950 g/cm$^3$, 3.0 methyl branches/1,000 carbon atoms)
(B)-[III]: a Ziegler-Natta high density ethylene-butene-1 copolymer (MI 5.0 g/10 min., density 0.948 g/cm$^3$, 0.014 ethyl branch /1,000 carbon atoms)

Component (C)
(C)-[I]: a non-crystalline-propylene random copolymer (Mooney viscosity ML1+4 (100° C.) 63, propylene content 23% by weight; JSR T 7961 (tradename of a product made by Japan Synthetic Rubber Co., Ltd.)
(C)-[II]: a non-crystalline ethylene-propylene random copolymer (Mooney viscosity ML1+4 (100° C.)40, propylene content 49% by weight; JSR EP 11 (tradename of a product made by Japan Synthetic Rubber Co., Ltd.)
(C)-[III]: a non-crystalline ethylene-propylene-ethylidenenorbornene random copolymer (Mooney viscosity ML1+4(100° C.)82, propylene content 26% by weight; JSR EP 57P (tradename of a product made by Japan Synthetic Rubber Co., Ltd.)

Component (D)
(D)-[I]: propylene homopolymer (MFR 6.0 g/10 min.)

Component (E)
(E)-[I]: a propylene homopolymer (MFR 6.0 g/10 min., isotactic pentad ratio 0.975)

PP: a propylene homopolymer having an isotactic pentad ratio outside those of the present invention (a propylene homopolymer of MFR 6.0 g/10 min. and isotactic pentad ratio 0.933)

EPB: a crystalline ethylene-propylene block copolymer (MFR 4.0 g/10 min., ethylene content 8.5% by weight)

Compound A: sodium 2,2'-methylene-bis(4,6-di-t-butylphenyl)phosphate (MARK NA-11UF, tradename of product made by ADEKA ARGUS Chemical Co., Ltd.)

Nucleating agent 1: aluminum p-t-butylbenzoate
Nucleating agent 2: 1.3,2.4-dibenzylidenesorbitol
Nucleating agent 3: sodium bis(4-t-butylphenyl)phosphate (MARK NA-10UF, tradename of product made by ADEKA ARGUS Chemical Co., Ltd.)
Phenolic antioxidant 1: 2,6-di-t-butyl-p-cresol
Phenolic antioxidant 2: tetrakis[methylene-3-(3',5'-di-t-butyl-4'-hydroxyphenyl) propionate]methane
Phosphoric antioxidant 1: bis(2,4-di-t-butylphenyl)pentaerythritol-diphosphite
Phosphoric antioxidant 2: tetrakis(2,4-di-t-butylphenyl)-4,4'-biphenylene-diphosphonite
Ca-St: calcium stearate

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Blending substances (parts by weight)* | | | | | | | | | | | | |
| Component (A) | (A)-[I] | 95 | 88 | 75 | 88 | 88 | 88 | 88 | 88 | 88 | 88 | 88 |
| E P B | | — | — | — | — | — | — | — | — | — | — | — |
| Component (B) | (B)-[I] | 2 | 5 | 10 | 5 | 5 | — | — | — | — | — | — |
| | (B)-[II] | — | — | — | — | — | 5 | 5 | 5 | — | — | — |
| | (B)-[III] | — | — | — | — | — | — | — | — | 5 | 5 | 5 |

TABLE 1-continued

|  |  |  |  |  |  |  |  |  |  |  |  |
|---|---|---|---|---|---|---|---|---|---|---|---|
| Component (C) | (C) [I] | 3 | 7 | 15 | — | — | 7 | — | — | 7 | — | — |
|  | (C)-[II] | — | — | — | 7 | — | — | 7 | — | — | 7 | — |
|  | (C)-[III] | — | — | — | — | 7 | — | — | 7 | — | — | 7 |
| Compound (a) |  | 0.1 | 0.1 | 0.1 | 0.1 | 0.1 | 0.1 | 0.1 | 0.1 | 0.1 | 0.1 | 0.1 |
| Nucleating agent 1 |  | — | — | — | — | — | — | — | — | — | — | — |
| Nucleating agent 2 |  | — | — | — | — | — | — | — | — | — | — | — |
| Nucleating agent 3 |  | — | — | — | — | — | — | — | — | — | — | — |
| Phenolic antioxidant 1 |  | 0.1 | 0.1 | 0.1 | 0.1 | 0.1 | 0.1 | 0.1 | 0.1 | 0.1 | 0.1 | 0.1 |
| Phenolic antioxidant 2 |  | 0.05 | 0.05 | 0.05 | 0.05 | 0.05 | 0.05 | 0.05 | 0.05 | 0.05 | 0.05 | 0.05 |
| Ca—St |  | 0.1 | 0.1 | 0.1 | 0.1 | 0.1 | 0.1 | 0.1 | 0.1 | 0.1 | 0.1 | 0.1 |
| Resistance to impact-whitening |  | ⊚ | ⊚ | ○ | ⊚ | ⊚ | ⊚ | ⊚ | ⊚ | ⊚ | ⊚ | ⊚ |
| Percentage of luster (%) |  | 105 | 103 | 102 | 103 | 102 | 103 | 104 | 103 | 104 | 103 | 103 |
| Izod impact strength (kgf·cm/cm) |  | 7.7 | 8.0 | 10.1 | 8.0 | 8.1 | 8.2 | 8.2 | 8.3 | 8.3 | 8.4 | 8.4 |
| Tensile strength (kgf/cm$^2$) |  | 300 | 283 | 251 | 283 | 282 | 280 | 281 | 280 | 278 | 278 | 277 |
| Flexural modulus ×10$^4$ (kgf/cm$^2$) |  | 1.30 | 1.22 | 1.06 | 1.21 | 1.21 | 1.20 | 1.20 | 1.19 | 1.17 | 1.17 | 1.17 |

|  |  | Comparative example |  |  |  |  |  |  |  |  |
|---|---|---|---|---|---|---|---|---|---|---|
|  |  | 1 | 2 | 3 | 4 | 5 | 6 | 7 | 8 | 9 |
| Blending substances (parts by weight)* |  |  |  |  |  |  |  |  |  |  |
| Component (A) | (A)-[I] | 95 | 88 | 75 | 88 | 88 | 88 | 90 | 80 | 65 |
| EPB |  | — | — | — | — | — | — | — | 10 | — |
| Component (B) | (B)-[I] | 2 | 5 | 10 | 5 | 5 | 5 | — | 10 | — |
|  | (B)-[II] | — | — | — | — | — | — | — | — | — |
|  | (B)-[III] | — | — | — | — | — | — | — | — | — |
| Component (C) | (C) [I] | 3 | 7 | 15 | 7 | 7 | 7 | 10 | — | 35 |
|  | (C)-[II] | — | — | — | — | — | — | — | — | — |
|  | (C)-[III] | — | — | — | — | — | — | — | — | — |
| Compound (a) |  | — | — | — | — | — | — | 0.1 | 0.1 | 0.1 |
| Nucleating agent 1 |  | — | — | — | 0.1 | — | — | — | — | — |
| Nucleating agent 2 |  | — | — | — | — | 0.1 | — | — | — | — |
| Nucleating agent 3 |  | — | — | — | — | — | 0.1 | — | — | — |
| Phenolic antioxidant 1 |  | 0.1 | 0.1 | 0.1 | 0.1 | 0.1 | 0.1 | 0.1 | 0.1 | 0.1 |
| Phenolic antioxidant 2 |  | 0.05 | 0.05 | 0.05 | 0.05 | 0.05 | 0.05 | 0.05 | 0.05 | 0.05 |
| Ca—St |  | 0.1 | 0.1 | 0.1 | 0.1 | 0.1 | 0.1 | 0.1 | 0.1 | 0.1 |
| Resistance to impact-whitening |  | ○ | ○ | ○ | ○ | ○ | ○ | ○ | X | Δ |
| Percentage of luster (%) |  | 99 | 98 | 98 | 99 | 102 | 102 | 101 | 102 | 99 |
| Izod impact strength (kgf·cm/cm) |  | 7.5 | 7.9 | 9.6 | 7.1 | 7.9 | 7.6 | 8.2 | 6.5 | NB |
| Tensile strength (kgf/cm$^2$) |  | 281 | 263 | 229 | 268 | 273 | 276 | 255 | 348 | 170 |
| Flexural modulus ×10$^4$ (kgf/cm$^2$) |  | 0.88 | 0.81 | 0.68 | 1.10 | 1.08 | 1.17 | 1.05 | 1.46 | 0.54 |

(Note)
*Parts by weight of compound (a) and additives per 100 parts by weight of resin. NB indicates no break.

TABLE 2

|  |  | Example |  |  |  |  |  |  |  |  |  |  |
|---|---|---|---|---|---|---|---|---|---|---|---|---|
|  |  | 12 | 13 | 14 | 15 | 16 | 17 | 18 | 19 | 20 | 21 | 22 |
| Blending substances (parts by weight)* |  |  |  |  |  |  |  |  |  |  |  |  |
| Component (A) | (A)-[II] | 95 | 88 | 75 | 88 | 88 | 88 | 88 | 88 | 88 | 88 | 88 |
| EPB |  | — | — | — | — | — | — | — | — | — | — | — |
| Component (B) | (B)-[I] | 2 | 5 | 10 | 5 | 5 | — | — | — | — | — | — |
|  | (B)-[II] | — | — | — | — | — | 5 | 5 | 5 | — | — | — |
|  | (B)-[III] | — | — | — | — | — | — | — | — | 5 | 5 | 5 |
| Component (C) | (C) [I] | 3 | 7 | 15 | — | — | 7 | — | — | 7 | — | — |
|  | (C)-[II] | — | — | — | 7 | — | — | 7 | — | — | 7 | — |
|  | (C)-[III] | — | — | — | — | 7 | — | — | 7 | — | — | 7 |
| Compound (a) |  | 0.1 | 0.1 | 0.1 | 0.1 | 0.1 | 0.1 | 0.1 | 0.1 | 0.1 | 0.1 | 0.1 |
| Nucleating agent 1 |  | — | — | — | — | — | — | — | — | — | — | — |
| Nucleating agent 2 |  | — | — | — | — | — | — | — | — | — | — | — |
| Nucleating agent 3 |  | — | — | — | — | — | — | — | — | — | — | — |
| Phenolic antioxidant 2 |  | 0.05 | 0.05 | 0.05 | 0.05 | 0.05 | 0.05 | 0.05 | 0.05 | 0.05 | 0.05 | 0.05 |
| Phosphoric antioxidant 1 |  | 0.05 | 0.05 | 0.05 | 0.05 | 0.05 | 0.05 | 0.05 | 0.05 | 0.05 | 0.05 | 0.05 |
| Ca—St |  | 0.1 | 0.1 | 0.1 | 0.1 | 0.1 | 0.1 | 0.1 | 0.1 | 0.1 | 0.1 | 0.1 |
| Resistance to impact-whitening |  | ⊚ | ⊚ | ○ | ⊚ | ⊚ | ⊚ | ⊚ | ⊚ | ⊚ | ⊚ | ⊚ |
| Percentage of luster (%) |  | 105 | 103 | 102 | 103 | 102 | 103 | 104 | 103 | 104 | 103 | 103 |
| Izod impact strength (kgf·cm/cm) |  | 8.7 | 9.0 | 11.4 | 9.0 | 9.2 | 9.3 | 9.3 | 9.4 | 9.5 | 9.5 | 9.5 |
| Tensile strength (kgf/cm$^2$) |  | 285 | 269 | 238 | 269 | 268 | 266 | 267 | 266 | 264 | 264 | 263 |
| Flexural modulus ×10$^4$ (kgf/cm$^2$) |  | 1.14 | 1.07 | 0.93 | 1.06 | 1.06 | 1.06 | 1.05 | 1.04 | 1.03 | 1.03 | 1.02 |

|  | Comparative example |  |  |  |  |  |  |  |  |
|---|---|---|---|---|---|---|---|---|---|
|  | 10 | 11 | 12 | 13 | 14 | 15 | 16 | 17 | 18 |
| Blending substances (parts by weight)* |  |  |  |  |  |  |  |  |  |

TABLE 2-continued

| Component (A) | (A)-[II] | 95 | 88 | 75 | 88 | 88 | 88 | 90 | 80 | 65 |
|---|---|---|---|---|---|---|---|---|---|---|
| EPB | | — | — | — | — | — | — | — | 10 | — |
| Component (B) | (B)-[I] | 2 | 5 | 10 | 5 | 5 | 5 | — | 10 | — |
| | (B)-[II] | — | — | — | — | — | — | — | — | — |
| | (B)-[III] | — | — | — | — | — | — | — | — | — |
| Component (C) | (C)-[I] | 3 | 7 | 15 | 7 | 7 | 7 | 10 | — | 35 |
| | (C)-[II] | — | — | — | — | — | — | — | — | — |
| | (C)-[III] | — | — | — | — | — | — | — | — | — |
| Compound (a) | | — | — | — | — | — | — | 0.1 | 0.1 | 0.1 |
| Nucleating agent 1 | | — | — | — | 0.1 | — | — | — | — | — |
| Nucleating agent 2 | | — | — | — | — | 0.1 | — | — | — | — |
| Nucleating agent 3 | | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 |
| Resistance to impact-whitening | | O | O | O | O | O | O | O | X | Δ |
| Percentage of luster (%) | | 99 | 98 | 98 | 99 | 100 | 104 | 101 | 102 | 99 |
| Izod impact strength (kgf·cm/cm) | | 7.9 | 8.3 | 10.1 | 7.2 | 8.1 | 8.4 | 9.3 | 7.3 | NB |
| Tensile strength (kgf/cm$^2$) | | 253 | 237 | 206 | 244 | 240 | 257 | 242 | 331 | 162 |
| Flexural modulus ×10$^4$ (kgf/cm$^2$) | | 0.77 | 0.71 | 0.60 | 0.97 | 0.93 | 1.03 | 0.92 | 1.28 | 0.48 |

(Note)
*Parts by weight of compound (a) and additives per 100 parts by weight of resin. NB indicates no break.

TABLE 3

| | | Example | | | | | | | | | | |
|---|---|---|---|---|---|---|---|---|---|---|---|---|
| | | 23 | 24 | 25 | 26 | 27 | 28 | 29 | 30 | 31 | 32 | 33 |
| Blending substances (parts by weight)* | | | | | | | | | | | | |
| Component (A) | (A)-[III] | 95 | 88 | 75 | 88 | 88 | 88 | 88 | 88 | 88 | 88 | 88 |
| EPB | | — | — | — | — | — | — | — | — | — | — | — |
| Component (B) | (B)-[I] | 2 | 5 | 10 | 5 | 5 | — | — | — | — | — | — |
| | (B)-[II] | — | — | — | — | — | 5 | 5 | 5 | — | — | — |
| | (B)-[III] | — | — | — | — | — | — | — | — | 5 | 5 | 5 |
| Component (C) | (C)-[I] | 3 | 7 | 15 | — | — | 7 | — | — | 7 | — | — |
| | (C)-[II] | — | — | — | 7 | — | — | 7 | — | — | 7 | — |
| | (C)-[III] | — | — | — | — | 7 | — | — | 7 | — | — | 7 |
| Compound (a) | | 0.1 | 0.1 | 0.1 | 0.1 | 0.1 | 0.1 | 0.1 | 0.1 | 0.1 | 0.1 | 0.1 |
| Nucleating agent 1 | | — | — | — | — | — | — | — | — | — | — | — |
| Nucleating agent 2 | | — | — | — | — | — | — | — | — | — | — | — |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ⊚ | ⊚ | O | ⊚ | ⊚ | ⊚ | ⊚ | ⊚ | ⊚ | ⊚ | ⊚ |
| Percentage of luster (%) | | 104 | 102 | 101 | 102 | 102 | 101 | 103 | 102 | 103 | 103 | 102 |
| Izod impact strength (kgf·cm/cm) | | 9.6 | 10.0 | 12.6 | 10.1 | 10.0 | 10.3 | 10.3 | 10.4 | 10.4 | 10.5 | 10.5 |
| Tensile strength (kgf/cm$^2$) | | 282 | 266 | 236 | 266 | 265 | 263 | 263 | 262 | 261 | 260 | 260 |
| Flexural modulus ×10$^4$ (kgf/cm$^2$) | | 1.12 | 1.05 | 0.91 | 1.04 | 1.04 | 1.03 | 1.02 | 1.01 | 1.00 | 1.00 | 1.00 |

| | | Comparative example | | | | | | | | |
|---|---|---|---|---|---|---|---|---|---|---|
| | | 19 | 20 | 21 | 22 | 23 | 24 | 25 | 26 | 27 |
| Blending substances (parts by weight)* | | | | | | | | | | |
| Component (A) | (A)-[III] | 95 | 88 | 75 | 88 | 88 | 88 | 90 | 80 | 65 |
| EPB | | — | — | — | — | — | — | — | 10 | — |
| Component (B) | (B)-[I] | 2 | 5 | 10 | 5 | 5 | 5 | — | 10 | — |
| | (B)-[II] | — | — | — | — | — | — | — | — | — |
| | (B)-[III] | — | — | — | — | — | — | — | — | — |
| Component (C) | (C)-[I] | 3 | 7 | 15 | 7 | 7 | 7 | 10 | — | 35 |
| | (C)-[II] | — | — | — | — | — | — | — | — | — |
| | (C)-[III] | — | — | — | — | — | — | — | — | — |
| Compound (a) | | — | — | — | — | — | — | 0.1 | 0.1 | 0.1 |
| Nucleating agent 1 | | — | — | — | 0.1 | — | — | — | — | — |
| Nucleating agent 2 | | — | — | — | — | 0.1 | — | — | — | — |
| Nucleating agent 3 | | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 |
| Resistance to impact-whitening | | O | O | O | O | O | O | O | X | Δ |
| Percentage of luster (%) | | 98 | 98 | 98 | 101 | 102 | 101 | 100 | 101 | 98 |
| Izod impact strength (kgf·cm/cm) | | 8.9 | 9.3 | 11.3 | 8.1 | 8.9 | 9.1 | 10.3 | 8.1 | NB |
| Tensile strength (kgf/cm$^2$) | | 253 | 237 | 206 | 241 | 238 | 254 | 240 | 327 | 160 |
| Flexural modulus ×10$^4$ | | 0.76 | 0.70 | 0.58 | 0.95 | 0.91 | 1.01 | 0.90 | 1.20 | 0.46 |

TABLE 3-continued (kgf/cm²)

(Note)
Parts by weight of compound (a) and additives per 100 parts by weight of resin. NB indicates no break.

TABLE 4

| | | Example | | | | | | | | | | |
|---|---|---|---|---|---|---|---|---|---|---|---|---|
| | | 34 | 35 | 36 | 37 | 38 | 39 | 40 | 41 | 42 | 43 | 44 |
| Blending substances (parts by weight)* | | | | | | | | | | | | |
| Component (A) | (A)-[IV] | 95 | 88 | 75 | 88 | 88 | 88 | 88 | 88 | 88 | 88 | 88 |
| | EPB | — | — | — | — | — | — | — | — | — | — | — |
| Component (B) | (B)-[I] | 2 | 5 | 10 | 5 | 5 | — | — | — | — | — | — |
| | (B)-[II] | — | — | — | — | — | 5 | 5 | 5 | — | — | — |
| | (B)-[III] | — | — | — | — | — | — | — | — | 5 | 5 | 5 |
| Component (C) | (C)-[I] | 3 | 7 | 15 | — | — | 7 | — | — | 7 | — | — |
| | (C)-[II] | — | — | — | 7 | — | — | 7 | — | — | 7 | — |
| | (C)-[III] | — | — | — | — | 7 | — | — | 7 | — | — | 7 |
| Compound (a) | | 0.1 | 0.1 | 0.1 | 0.1 | 0.1 | 0.1 | 0.1 | 0.1 | 0.1 | 0.1 | 0.1 |
| Nucleating agent 1 | | — | — | — | — | — | — | — | — | — | — | — |
| Nucleating agent 2 | | — | — | — | — | — | — | — | — | — | — | — |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 2 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ◎ | ◎ | ○ | ◎ | ◎ | ◎ | ◎ | ◎ | ◎ | ◎ | ◎ |
| Percentage of luster (%) | | 105 | 103 | 102 | 103 | 102 | 103 | 104 | 103 | 104 | 103 | 103 |
| Izod impact strength (kgf·cm/cm) | | 12.1 | 12.6 | 15.9 | 12.6 | 12.7 | 12.8 | 12.8 | 12.9 | 13.0 | 13.3 | 13.2 |
| Tensile strength (kgf/cm²) | | 243 | 229 | 203 | 229 | 228 | 226 | 225 | 226 | 225 | 224 | 224 |
| Flexural modulus ×10⁴ (kgf/cm²) | | 0.81 | 0.76 | 0.66 | 0.75 | 0.74 | 0.75 | 0.75 | 0.74 | 0.74 | 0.73 | 0.73 |

| | | Comparative example | | | | | | | | |
|---|---|---|---|---|---|---|---|---|---|---|
| | | 28 | 29 | 30 | 31 | 32 | 33 | 34 | 35 | 36 |
| Blending substances (parts by weight)* | | | | | | | | | | |
| Component (A) | (A)-[IV] | 95 | 88 | 75 | 88 | 88 | 88 | 90 | 80 | 65 |
| | EPB | — | — | — | — | — | — | — | 10 | — |
| Component (B) | (B)-[I] | 2 | 5 | 10 | 5 | 5 | 5 | — | 10 | — |
| | (B)-[II] | — | — | — | — | — | — | — | — | — |
| | (B)-[III] | — | — | — | — | — | — | — | — | — |
| Component (C) | (C)-[I] | 3 | 7 | 15 | 7 | 7 | 7 | 10 | — | 35 |
| | (C)-[II] | — | — | — | — | — | — | — | — | — |
| | (C)-[III] | — | — | — | — | — | — | — | — | — |
| Compound (a) | | — | — | — | — | — | — | 0.1 | 0.1 | 0.1 |
| Nucleating agent 1 | | — | — | — | 0.1 | — | — | — | — | — |
| Nucleating agent 2 | | — | — | — | — | 0.1 | — | — | — | — |
| Nucleating agent 3 | | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 |
| Phosphoric antioxidant 2 | | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 |
| Resistance to impact-whitening | | ○ | ○ | ○ | ○ | ○ | ○ | ○ | X | Δ |
| Percentage of luster (%) | | 99 | 98 | 98 | 99 | 100 | 107 | 101 | 102 | 99 |
| Izod impact strength (kgf·cm/cm) | | 10.5 | 11.1 | 13.4 | 9.9 | 11.1 | 11.5 | 12.9 | 10.2 | NB |
| Tensile strength (kgf/cm²) | | 197 | 184 | 160 | 198 | 202 | 213 | 207 | 282 | 138 |
| Flexural modulus ×10⁴ (kgf/cm²) | | 0.55 | 0.50 | 0.42 | 0.68 | 0.67 | 0.73 | 0.65 | 0.91 | 0.33 |

(Note)
*Parts by weight of compound (a) and additives per 100 parts by weight of resin. NB indicates no break.

TABLE 5

| | | Example | | | | | | | | | | |
|---|---|---|---|---|---|---|---|---|---|---|---|---|
| | | 45 | 46 | 47 | 48 | 49 | 50 | 51 | 52 | 53 | 54 | 55 |
| Blending substances (parts by weight)* | | | | | | | | | | | | |
| Component (A) | (A)-[I] | 85 | 78 | 65 | 78 | 78 | 78 | 78 | 78 | 78 | 78 | 78 |
| Component (D) | (D)-[I] | 10 | 10 | 10 | 10 | 10 | 10 | 10 | 10 | 10 | 10 | 10 |
| | EPB | — | — | — | — | — | — | — | — | — | — | — |
| Component (B) | (B)-[I] | 2 | 5 | 10 | 5 | 5 | — | — | — | — | — | — |
| | (B)-[II] | — | — | — | — | — | 5 | 5 | 5 | — | — | — |
| | (B)-[III] | — | — | — | — | — | — | — | — | 5 | 5 | 5 |
| Component (C) | (C)-[I] | 3 | 7 | 15 | — | — | 7 | — | — | 7 | — | — |
| | (C)-[II] | — | — | — | 7 | — | — | 7 | — | — | 7 | — |
| | (C)-[III] | — | — | — | — | 7 | — | — | 7 | — | — | 7 |

TABLE 5-continued

| | | | | | | | | | | | |
|---|---|---|---|---|---|---|---|---|---|---|---|
| Compound (a) | 0.1 | 0.1 | 0.1 | 0.1 | 0.1 | 0.1 | 0.1 | 0.1 | 0.1 | 0.1 | 0.1 |
| Nucleating agent 1 | — | — | — | — | — | — | — | — | — | — | — |
| Nucleating agent 2 | — | — | — | — | — | — | — | — | — | — | — |
| Nucleating agent 3 | — | — | — | — | — | — | — | — | — | — | — |
| Phenolic antioxidant 1 | 0.1 | 0.1 | 0.1 | 0.1 | 0.1 | 0.1 | 0.1 | 0.1 | 0.1 | 0.1 | 0.1 |
| Phenolic antioxidant 2 | 0.05 | 0.05 | 0.05 | 0.05 | 0.05 | 0.05 | 0.05 | 0.05 | 0.05 | 0.05 | 0.05 |
| Ca—St | 0.1 | 0.1 | 0.1 | 0.1 | 0.1 | 0.1 | 0.1 | 0.1 | 0.1 | 0.1 | 0.1 |
| Resistance to impact-whitening | ◎ | ◎ | ○ | ◎ | ◎ | ◎ | ◎ | ◎ | ◎ | ◎ | ◎ |
| Percentage of luster (%) | 100 | 98 | 97 | 97 | 97 | 98 | 98 | 98 | 99 | 99 | 98 |
| Izod impact strength (kgf·cm/cm) | 7.4 | 7.7 | 9.9 | 7.7 | 7.8 | 7.9 | 7.8 | 7.9 | 8.0 | 7.9 | 8.0 |
| Tensile strength(kgf/cm$^2$) | 314 | 297 | 266 | 297 | 296 | 294 | 294 | 295 | 292 | 293 | 290 |
| Flexural modulus ×10$^4$ (kgf/cm$^2$) | 1.31 | 1.24 | 1.08 | 1.22 | 1.23 | 1.22 | 1.21 | 1.20 | 1.20 | 1.19 | 1.18 |

| | | Comparative example | | | | | | | | |
|---|---|---|---|---|---|---|---|---|---|---|
| | | 37 | 38 | 39 | 40 | 41 | 42 | 43 | 44 | 45 |
| Blending substances (parts by weight)* | | | | | | | | | | |
| Component (A) | (A)-[I] | 85 | 78 | 65 | 78 | 78 | 78 | 90 | 80 | 20 |
| Component (D) | (D)-[I] | 10 | 10 | 10 | 10 | 10 | 10 | — | — | 77 |
| EPB | | — | — | — | — | — | — | — | 10 | — |
| Component (B) | (B)-[I] | 2 | 5 | 10 | 5 | 5 | 5 | — | 10 | — |
| | (B)-[II] | — | — | — | — | — | — | — | — | — |
| | (B)-[III] | — | — | — | — | — | — | — | — | — |
| Component (C) | (C)-[I] | 3 | 7 | 15 | 7 | 7 | 7 | 10 | — | 3 |
| | (C)-[II] | — | — | — | — | — | — | — | — | — |
| | (C)-[III] | — | — | — | — | — | — | — | — | — |
| Compound (a) | | — | — | — | — | — | — | 0.1 | 0.1 | 0.1 |
| Nucleating agent 1 | | — | — | — | 0.1 | — | — | — | — | — |
| Nucleating agent 2 | | — | — | — | — | 0.1 | — | — | — | — |
| Nucleating agent 3 | | — | — | — | — | — | 0.1 | — | — | — |
| Phenolic antioxidant 1 | | 0.1 | 0.1 | 0.1 | 0.1 | 0.1 | 0.1 | 0.1 | 0.1 | 0.1 |
| Phenolic antioxidant 2 | | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 |
| Resistance to impact-whitening | | ○ | ○ | Δ | ○ | ○ | ○ | ○ | X | ○ |
| Percentage of luster (%) | | 95 | 93 | 94 | 93 | 97 | 98 | 101 | 102 | 99 |
| Izod impact strength (kgf·cm/cm) | | 7.2 | 7.7 | 9.5 | 6.9 | 7.6 | 7.2 | 8.2 | 6.5 | 4.6 |
| Tensile strength(kgf/cm$^2$) | | 293 | 275 | 242 | 281 | 285 | 289 | 255 | 348 | 316 |
| Flexural modulus ×10$^4$ (kgf/cm$^2$) | | 0.89 | 0.83 | 0.69 | 1.11 | 1.09 | 1.19 | 1.05 | 1.46 | 1.33 |

(Note)
*Parts by weight of compound (a) and additives per 100 parts by weight of resin.

TABLE 6

| | | Example | | | | | | | | | | |
|---|---|---|---|---|---|---|---|---|---|---|---|---|
| | | 56 | 57 | 58 | 59 | 60 | 61 | 62 | 63 | 64 | 65 | 66 |
| Blending substances (parts by weight)* | | | | | | | | | | | | |
| Component (A) | (A)-[II] | 85 | 78 | 65 | 78 | 78 | 78 | 78 | 78 | 78 | 78 | 78 |
| Component (D) | (D)-[I] | 10 | 10 | 10 | 10 | 10 | 10 | 10 | 10 | 10 | 10 | 10 |
| EPB | | — | — | — | — | — | — | — | — | — | — | — |
| Component (B) | (B)-[I] | 2 | 5 | 10 | 5 | 5 | — | — | — | — | — | — |
| | (B)-[II] | — | — | — | — | — | 5 | 5 | 5 | — | — | — |
| | (B)-[III] | — | — | — | — | — | — | — | — | 5 | 5 | 5 |
| Component (C) | (C)-[I] | 3 | 7 | 15 | — | — | 7 | — | 7 | — | — | — |
| | (C)-[II] | — | — | — | 7 | — | — | 7 | — | 7 | — | — |
| | (C)-[III] | — | — | — | — | 7 | — | — | 7 | — | 7 | 7 |
| Compound (a) | | 0.1 | 0.1 | 0.1 | 0.1 | 0.1 | 0.1 | 0.1 | 0.1 | 0.1 | 0.1 | 0.1 |
| Nucleating agent 1 | | — | — | — | — | — | — | — | — | — | — | — |
| Nucleating agent 2 | | — | — | — | — | — | — | — | — | — | — | — |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ◎ | ◎ | ○ | ◎ | ◎ | ◎ | ◎ | ◎ | ◎ | ◎ | ◎ |
| Percentage of luster (%) | | 100 | 98 | 97 | 97 | 97 | 98 | 98 | 98 | 99 | 99 | 98 |
| Izod impact strength (kgf·cm/cm) | | 8.4 | 8.7 | 11.2 | 8.7 | 8.7 | 8.8 | 8.8 | 8.9 | 9.0 | 8.9 | 9.0 |
| Tensile strength(kgf/cm$^2$) | | 298 | 282 | 253 | 282 | 281 | 280 | 280 | 278 | 277 | 276 | 276 |
| Flexural modulus ×10$^4$ (kgf/cm$^2$) | | 1.15 | 1.09 | 0.95 | 1.07 | 1.06 | 1.06 | 1.05 | 1.05 | 1.05 | 1.04 | 1.04 |

TABLE 6-continued

|  |  | Comparative example | | | | | | | | |
|---|---|---|---|---|---|---|---|---|---|---|
|  |  | 46 | 47 | 48 | 49 | 50 | 51 | 52 | 53 | 54 |
| Blending substances (parts by weight)* | | | | | | | | | | |
| Component (A) | (A)-[II] | 85 | 78 | 65 | 78 | 78 | 78 | 90 | 80 | 20 |
| Component (D) | (D)-[I] | 10 | 10 | 10 | 10 | 10 | 10 | — | — | 77 |
| EPB | | — | — | — | — | — | — | — | 10 | — |
| Component (B) | (B)-[I] | 2 | 5 | 10 | 5 | 5 | 5 | — | 10 | — |
|  | (B)-[II] | — | — | — | — | — | — | — | — | — |
|  | (B)-[III] | — | — | — | — | — | — | — | — | — |
| Component (C) | (C)-[I] | 3 | 7 | 15 | 7 | 7 | 7 | 10 | — | 3 |
|  | (C)-[II] | — | — | — | — | — | — | — | — | — |
|  | (C)-[III] | — | — | — | — | — | — | — | — | — |
| Compound (a) | | — | — | — | — | — | — | 0.1 | 0.1 | 0.1 |
| Nucleating agent 1 | | — | — | — | 0.1 | — | — | — | — | — |
| Nucleating agent 2 | | — | — | — | — | 0.1 | — | — | — | — |
| Nucleating agent 3 | | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 |
| Resistance to impact-whitening | | O | O | Δ | O | O | O | O | X | O |
| Percentage of luster (%) | | 95 | 93 | 94 | 95 | 99 | 98 | 101 | 102 | 99 |
| Izod impact strength (kgf·cm/cm) | | 7.6 | 8.1 | 10.0 | 7.0 | 7.8 | 7.9 | 9.3 | 7.3 | 4.8 |
| Tensile strength (kgf/cm$^2$) | | 267 | 250 | 220 | 256 | 251 | 269 | 242 | 331 | 313 |
| Flexural modulus ×10$^4$ (kgf/cm$^2$) | | 0.78 | 0.73 | 0.61 | 0.98 | 0.94 | 1.05 | 0.92 | 1.28 | 1.30 |

(Note)
*Parts by weight of compound (a) and additives per 100 parts by weight of resin.

TABLE 7

|  |  | Example | | | | | | | | | | |
|---|---|---|---|---|---|---|---|---|---|---|---|---|
|  |  | 67 | 68 | 69 | 70 | 71 | 72 | 73 | 74 | 75 | 76 | 77 |
| Blending substances (parts by weight)* | | | | | | | | | | | | |
| Component (A) | (A)-[III] | 85 | 78 | 65 | 78 | 78 | 78 | 78 | 78 | 78 | 78 | 78 |
| Component (D) | (D)-[I] | 10 | 10 | 10 | 10 | 10 | 10 | 10 | 10 | 10 | 10 | 10 |
| EPB | | — | — | — | — | — | — | — | — | — | — | — |
| Component (B) | (B)-[I] | 2 | 5 | 10 | 5 | 5 | — | — | — | — | — | — |
|  | (B)-[II] | — | — | — | — | — | 5 | 5 | 5 | — | — | — |
|  | (B)-[III] | — | — | — | — | — | — | — | — | 5 | 5 | 5 |
| Component (C) | (C)-[I] | 3 | 7 | 15 | — | — | 7 | — | — | 7 | — | — |
|  | (C)-[II] | — | — | — | 7 | — | — | 7 | — | — | 7 | — |
|  | (C)-[III] | — | — | — | — | 7 | — | — | 7 | — | — | 7 |
| Compound (a) | | 0.1 | 0.1 | 0.1 | 0.1 | 0.1 | 0.1 | 0.1 | 0.1 | 0.1 | 0.1 | 0.1 |
| Nucleating agent 1 | | — | — | — | — | — | — | — | — | — | — | — |
| Nucleating agent 2 | | — | — | — | — | — | — | — | — | — | — | — |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ◎ | ◎ | O | ◎ | ◎ | ◎ | ◎ | ◎ | ◎ | ◎ | ◎ |
| Percentage of luster (%) | | 99 | 97 | 97 | 96 | 96 | 97 | 98 | 97 | 98 | 98 | 97 |
| Izod impact strength (kgf·cm/cm) | | 9.3 | 9.6 | 12.4 | 9.6 | 9.5 | 9.6 | 9.7 | 9.8 | 9.9 | 10.0 | 10.0 |
| Tensile strength (kgf/cm$^2$) | | 295 | 279 | 250 | 279 | 278 | 276 | 276 | 275 | 274 | 273 | 273 |
| Flexural modulus × 10$^4$ (kgf/cm$^2$) | | 1.13 | 1.07 | 0.93 | 1.05 | 1.04 | 1.03 | 1.03 | 1.02 | 1.02 | 1.01 | 1.01 |

|  |  | Comparative example | | | | | | | | |
|---|---|---|---|---|---|---|---|---|---|---|
|  |  | 55 | 56 | 57 | 58 | 59 | 60 | 61 | 62 | 63 |
| Blending substances (parts by weight)* | | | | | | | | | | |
| Component (A) | (A)-[III] | 85 | 78 | 65 | 78 | 78 | 78 | 90 | 80 | 20 |
| Component (D) | (D)-[I] | 10 | 10 | 10 | 10 | 10 | 10 | — | — | 77 |
| EPB | | — | — | — | — | — | — | 10 | — | — |
| Component (B) | (B)-[I] | 2 | 5 | 10 | 5 | 5 | 5 | — | 10 | — |
|  | (B)-[II] | — | — | — | — | — | — | — | — | — |
|  | (B)-[III] | — | — | — | — | — | — | — | — | — |
| Component (C) | (C)-[I] | 3 | 7 | 15 | 7 | 7 | 7 | 10 | — | 3 |
|  | (C)-[II] | — | — | — | — | — | — | — | — | — |
|  | (C)-[III] | — | — | — | — | — | — | — | — | — |
| Compound (a) | | — | — | — | — | — | — | 0.1 | 0.1 | 0.1 |

TABLE 7-continued

| | | | | | | | | | |
|---|---|---|---|---|---|---|---|---|---|
| Nucleating agent 1 | — | — | — | 0.1 | — | — | — | — | — |
| Nucleating agent 2 | — | — | — | — | 0.1 | — | — | — | — |
| Nucleating agent 3 | — | — | — | — | — | 0.1 | — | — | — |
| Phenolic antioxidant 2 | 0.05 | 0.05 | 0.05 | 0.05 | 0.05 | 0.05 | 0.05 | 0.05 | 0.05 |
| Phosphoric antioxidant 1 | 0.05 | 0.05 | 0.05 | 0.05 | 0.05 | 0.05 | 0.05 | 0.05 | 0.05 |
| Ca—St | 0.1 | 0.1 | 0.1 | 0.1 | 0.1 | 0.1 | 0.1 | 0.1 | 0.1 |
| Resistance to impact-whitening | ○ | ○ | Δ | ○ | ○ | ○ | ○ | X | ○ |
| Percentage of luster (%) | 94 | 93 | 92 | 95 | 97 | 97 | 100 | 101 | 99 |
| Izod impact strength (kgf · cm/cm) | 8.2 | 8.8 | 10.8 | 7.9 | 8.6 | 8.6 | 10.3 | 8.1 | 5.1 |
| Tensile strength (kgf/cm$^2$) | 264 | 248 | 218 | 253 | 248 | 266 | 240 | 327 | 310 |
| Flexural modulus +10$^4$ (kgf/cm$^2$) | 0.77 | 0.71 | 0.59 | 0.95 | 0.92 | 1.02 | 0.90 | 1.20 | 1.28 |

(Note)
*parts by weight of compound (a) and additives per 100 parts by weight of resin.

TABLE 8

| | | Example | | | | | | | | | | |
|---|---|---|---|---|---|---|---|---|---|---|---|---|
| | | 78 | 79 | 80 | 81 | 82 | 83 | 84 | 85 | 86 | 87 | 88 |
| Blending substances (Parts by weight)* | | | | | | | | | | | | |
| Component (A) | (A)-[IV] | 85 | 78 | 65 | 78 | 78 | 78 | 78 | 78 | 78 | 78 | 78 |
| Component (D) | (D)-[I] | 10 | 10 | 10 | 10 | 10 | 10 | 10 | 10 | 10 | 10 | 10 |
| EPB | | — | — | — | — | — | — | — | — | — | — | — |
| Component (B) | (B)-[I] | 2 | 5 | 10 | 5 | 5 | — | — | — | — | — | — |
| | (B)-[II] | — | — | — | — | — | 5 | 5 | 5 | — | — | — |
| | (B)-[III] | — | — | — | — | — | — | — | — | 5 | 5 | 5 |
| Component (C) | (C)-[I] | 3 | 7 | 15 | — | — | 7 | — | — | 7 | — | — |
| | (C)-[II] | — | — | — | 7 | — | — | 7 | — | — | 7 | — |
| | (C)-[III] | — | — | — | — | 7 | — | — | 7 | — | — | 7 |
| Compound (a) | | 0.1 | 0.1 | 0.1 | 0.1 | 0.1 | 0.1 | 0.1 | 0.1 | 0.1 | 0.1 | 0.1 |
| Nucleating agent 1 | | — | — | — | — | — | — | — | — | — | — | — |
| Nucleating agent 2 | | — | — | — | — | — | — | — | — | — | — | — |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 2 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ◎ | ◎ | ○ | ◎ | ◎ | ◎ | ◎ | ◎ | ◎ | ◎ | ◎ |
| Percentage of luster (%) | | 100 | 98 | 97 | 97 | 97 | 98 | 98 | 98 | 99 | 99 | 98 |
| Izod impact strength (kgf · cm/cm) | | 11.6 | 12.1 | 15.5 | 12.1 | 12.1 | 12.2 | 12.3 | 12.3 | 12.4 | 12.5 | 12.6 |
| Tensile strength (kgf/cm$^2$) | | 254 | 241 | 215 | 241 | 240 | 238 | 238 | 237 | 236 | 235 | 235 |
| Flexural modulus ×10$^4$ (kgf/cm$^2$) | | 0.81 | 0.77 | 0.67 | 0.76 | 0.75 | 0.74 | 0.75 | 0.75 | 0.73 | 0.74 | 0.73 |

| | | Comparative example | | | | | | | | |
|---|---|---|---|---|---|---|---|---|---|---|
| | | 64 | 65 | 66 | 67 | 68 | 69 | 70 | 71 | 72 |
| Blending substances (Parts by weight)* | | | | | | | | | | |
| Component (A) | (A)-[IV] | 85 | 78 | 65 | 78 | 78 | 78 | 90 | 80 | 20 |
| Component (D) | (D)-[I] | 10 | 10 | 10 | 10 | 10 | 10 | — | — | 77 |
| EPB | | — | — | — | — | — | — | — | 10 | — |
| Component (B) | (B)-[I] | 2 | 5 | 10 | 5 | 5 | 5 | — | 10 | — |
| | (B)-[II] | — | — | — | — | — | — | — | — | — |
| | (B)-[III] | — | — | — | — | — | — | — | — | — |
| Component (C) | (C)-[I] | 3 | 7 | 15 | 7 | 7 | 7 | 10 | — | 3 |
| | (C)-[II] | — | — | — | — | — | — | — | — | — |
| | (C)-[III] | — | — | — | — | — | — | — | — | — |
| Compound (a) | | — | — | — | — | — | — | 0.1 | 0.1 | 0.1 |
| Nucleating agent 1 | | — | — | — | 0.1 | — | — | — | — | — |
| Nucleating agent 2 | | — | — | — | — | 0.1 | — | — | — | — |
| Nucleating agent 3 | | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 |
| Phosphoric antioxidant 2 | | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 |
| Resistance to impact-whitening | | ○ | ○ | Δ | ○ | ○ | ○ | ○ | X | ○ |
| Percentage of lustex (%) | | 95 | 93 | 94 | 94 | 102 | 98 | 101 | 102 | 99 |
| Izod impact strength (kgf · cm/cm) | | 10.1 | 10.7 | 13.2 | 9.6 | 10.6 | 10.9 | 12.9 | 10.2 | 5.3 |
| Tensile strength (kgf/cm$^2$) | | 217 | 204 | 179 | 208 | 211 | 223 | 207 | 282 | 308 |
| Flexural modulus ×10$^4$ | | 0.55 | 0.51 | 0.43 | 0.69 | 0.68 | 0.74 | 0.65 | 0.91 | 1.24 |

TABLE 8-continued (kgf/cm²)

(Note)
*parts by weight of compound (a) and additives per 100 parts by weight of resin.

TABLE 9

| | | Example | | | | | | | | Comparative example | | |
|---|---|---|---|---|---|---|---|---|---|---|---|---|
| | | 89 | 90 | 91 | 92 | 93 | 94 | 95 | 96 | 73 | 74 | 75 |
| Blending substances (parts by weight)* | | | | | | | | | | | | |
| Component (A) | (A)-[I] | 85 | 78 | 65 | 78 | 78 | 78 | 78 | 78 | 78 | 78 | 78 |
| Component (E) | (E)-[I] | 10 | 10 | 10 | 10 | 10 | 10 | 10 | 10 | — | — | — |
| PP | | — | — | — | — | — | — | — | — | 10 | 10 | 10 |
| EPB | | — | — | — | — | — | — | — | — | — | — | — |
| Component (B) | (B)-[I] | 2 | 5 | 10 | 5 | — | — | — | — | 5 | 5 | 5 |
| | (B)-[II] | — | — | — | — | 5 | 5 | — | — | — | — | — |
| | (B)-[III] | — | — | — | — | — | — | 5 | 5 | — | — | — |
| Component (C) | (C)-[I] | 3 | 7 | 15 | — | 7 | — | 7 | — | 7 | 7 | 7 |
| | (C)-[III] | — | — | — | 7 | — | 7 | — | 7 | — | — | — |
| Compound (a) | | 0.1 | 0.1 | 0.1 | 0.1 | 0.1 | 0.1 | 0.1 | 0.1 | 0.1 | — | — |
| Nucleating agent 1 | | — | — | — | — | — | — | — | — | — | 0.1 | — |
| Nucleating agent 2 | | — | — | — | — | — | — | — | — | — | — | 0.1 |
| Nucleating agent 3 | | — | — | — | — | — | — | — | — | — | — | — |
| Phenolic antioxidant 1 | | 0.1 | 0.1 | 0.1 | 0.1 | 0.1 | 0.1 | 0.1 | 0.1 | 0.1 | 0.1 | 0.1 |
| Phenolic antioxidant 2 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ◎ | ◎ | ◎ | ◎ | ◎ | ◎ | ◎ | ◎ | ◎ | ○ | ○ |
| Percentage of luster (%) | | 101 | 99 | 98 | 98 | 98 | 98 | 99 | 99 | 98 | 93 | 97 |
| Izod impact strength (kgf·cm/cm) | | 7.2 | 7.5 | 9.8 | 7.6 | 7.7 | 7.8 | 7.8 | 7.7 | 7.7 | 6.9 | 7.6 |
| Tensile strength (kgf/cm²) | | 323 | 307 | 278 | 306 | 305 | 306 | 305 | 304 | 297 | 281 | 285 |
| Flexural modulus ×10⁴ (kgf/cm²) | | 1.38 | 1.30 | 1.15 | 1.29 | 1.28 | 1.28 | 1.27 | 1.27 | 1.24 | 1.11 | 1.09 |

| | | Comparative example | | | | | | | | | |
|---|---|---|---|---|---|---|---|---|---|---|---|
| | | 76 | 77 | 78 | 79 | 80 | 81 | 82 | 83 | 84 | 85 |
| Blending substances (parts by weight)* | | | | | | | | | | | |
| Component (A) | (A)-[I] | 78 | 85 | 78 | 65 | 78 | 78 | 78 | 90 | 80 | 20 |
| Component (E) | (E)-[I] | — | 10 | 10 | 10 | 10 | 10 | 10 | — | — | — |
| PP | | 10 | — | — | — | — | — | — | — | — | 77 |
| EPB | | — | — | — | — | — | — | — | — | 10 | — |
| Component (B) | (B)-[I] | 5 | 2 | 5 | 10 | 5 | 5 | 5 | — | 10 | — |
| | (B)-[II] | — | — | — | — | — | — | — | — | — | — |
| | (B)-[III] | — | — | — | — | — | — | — | — | — | — |
| Component (C) | (C)-[I] | 7 | 3 | 7 | 15 | 7 | 7 | 7 | 10 | — | 3 |
| | (C)-[III] | — | — | — | — | — | — | — | — | — | — |
| Compound (a) | | — | — | — | — | — | — | — | 0.1 | 0.1 | 0.1 |
| Nucleating agent 1 | | — | — | — | — | 0.1 | — | — | — | — | — |
| Nucleating agent 2 | | — | — | — | — | — | 0.1 | — | — | — | — |
| Nucleating agent 3 | | 0.1 | — | — | — | — | — | 0.1 | — | — | — |
| Phenolic antioxidant 1 | | 0.1 | 0.1 | 0.1 | 0.1 | 0.1 | 0.1 | 0.1 | 0.1 | 0.1 | 0.1 |
| Phenolic antioxidant 2 | | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 |
| Resistance to impact-whitening | | ○ | ○ | ○ | Δ | ○ | ○ | ○ | ○ | X | ○ |
| Percentage of luster (%) | | 98 | 98 | 95 | 96 | 94 | 98 | 99 | 101 | 102 | 99 |
| Izod impact strength (kgf·cm/cm) | | 7.2 | 7.3 | 7.6 | 9.9 | 6.7 | 7.3 | 7.2 | 8.2 | 6.5 | 5.6 |
| Tensile strength (kgf/cm²) | | 289 | 302 | 287 | 258 | 260 | 296 | 299 | 255 | 348 | 316 |
| Flexural modulus ×10⁴ (kgf/cm²) | | 1.19 | 1.18 | 1.12 | 0.98 | 1.16 | 1.17 | 1.22 | 1.05 | 1.46 | 1.33 |

(Note)
*parts by weight of compound (a) and additives per 100 parts by weight of resin.

TABLE 10

| | | Example | | | | | | | | Comparative example | | |
|---|---|---|---|---|---|---|---|---|---|---|---|---|
| | | 97 | 98 | 99 | 100 | 101 | 102 | 103 | 104 | 86 | 87 | 88 |
| Blending substances (parts by weight)* | | | | | | | | | | | | |
| Component (A) | (A)-[II] | 85 | 78 | 65 | 78 | 78 | 78 | 78 | 78 | 78 | 78 | 78 |
| Component (E) | (E)-[I] | 10 | 10 | 10 | 10 | 10 | 10 | 10 | 10 | — | — | — |

TABLE 10-continued

| (E) | | | | | | | | | | | | |
|---|---|---|---|---|---|---|---|---|---|---|---|---|
| PP | | — | — | — | — | — | — | — | — | 10 | 10 | 10 |
| EPB | | — | — | — | — | — | — | — | — | — | — | — |
| Component (B) | (B)-[I] | 2 | 5 | 10 | 5 | — | — | — | — | 5 | 5 | 5 |
| | (B)-[II] | — | — | — | — | 5 | 5 | — | — | — | — | — |
| | (B)-[III] | — | — | — | — | — | — | 5 | 5 | — | — | — |
| Component (C) | (C)-[I] | 3 | 7 | 15 | — | 7 | — | 7 | — | 7 | 7 | 7 |
| | (C)-[III] | — | — | — | 7 | — | 7 | — | 7 | — | — | — |
| Compound (a) | | 0.1 | 0.1 | 0.1 | 0.1 | 0.1 | 0.1 | 0.1 | 0.1 | 0.1 | — | — |
| Nucleating agent 1 | | — | — | — | — | — | — | — | — | — | 0.1 | — |
| Nucleating agent 2 | | — | — | — | — | — | — | — | — | — | — | 0.1 |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ◎ | ◎ | ◎ | ◎ | ◎ | ◎ | ◎ | ◎ | ◎ | ○ | ○ |
| Percentage of luster (%) | | 101 | 99 | 98 | 98 | 98 | 98 | 99 | 99 | 98 | 95 | 99 |
| Izod impact strength (kgf·cm/cm) | | 8.1 | 8.5 | 11.1 | 8.6 | 8.7 | 8.8 | 8.7 | 8.7 | 8.7 | 7.0 | 7.8 |
| Tensile strength (kgf/cm$^2$) | | 307 | 292 | 264 | 291 | 290 | 290 | 289 | 289 | 282 | 256 | 251 |
| Flexural modulus ×10$^4$ (kgf/cm$^2$) | | 1.21 | 1.14 | 1.01 | 1.14 | 1.13 | 1.13 | 1.13 | 1.12 | 1.09 | 0.98 | 0.94 |

| | | Comparative example | | | | | | | | | |
|---|---|---|---|---|---|---|---|---|---|---|---|
| | | 89 | 90 | 91 | 92 | 93 | 94 | 95 | 96 | 97 | 98 |
| Blending substances (parts by weight)* | | | | | | | | | | | |
| Component (A) | (A)-[II] | 78 | 85 | 78 | 65 | 78 | 78 | 78 | 90 | 80 | 20 |
| Component (E) | (E)-[I] | — | 10 | 10 | 10 | 10 | 10 | 10 | — | — | — |
| PP | | 10 | — | — | — | — | — | — | — | — | 77 |
| EPB | | — | — | — | — | — | — | — | 10 | — | — |
| Component (B) | (B)-[I] | 5 | 2 | 5 | 10 | 5 | 5 | 5 | — | 10 | — |
| | (B)-[II] | — | — | — | — | — | — | — | — | — | — |
| | (B)-[III] | — | — | — | — | — | — | — | — | — | — |
| Component (C) | (C)-[I] | 7 | 3 | 7 | 15 | 7 | 7 | 7 | 10 | — | 3 |
| | (C)-[III] | — | — | — | — | — | — | — | — | — | — |
| Compound (a) | | — | — | — | — | — | — | — | 0.1 | 0.1 | 0.1 |
| Nucleating agent 1 | | — | — | — | — | 0.1 | — | — | — | — | — |
| Nucleating agent 2 | | — | — | — | — | — | 0.1 | — | — | — | — |
| Nucleating agent 3 | | 0.1 | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 |
| Resistance to impact-whitening | | ○ | ○ | ○ | Δ | ○ | ○ | ○ | ○ | X | ○ |
| Percentage of luster (%) | | 98 | 98 | 95 | 96 | 95 | 100 | 99 | 101 | 102 | 99 |
| Izod impact strength (kgf·cm/cm) | | 7.9 | 7.4 | 7.8 | 10.1 | 6.8 | 7.4 | 7.9 | 9.3 | 7.3 | 4.8 |
| Tensile strength (kgf/cm$^2$) | | 269 | 275 | 261 | 235 | 264 | 260 | 278 | 242 | 331 | 313 |
| Flexural modulus ×10$^4$ (kgf/cm$^2$) | | 1.05 | 1.04 | 0.99 | 0.86 | 1.02 | 1.01 | 1.07 | 0.92 | 1.28 | 1.30 |

(Note)
*parts by weight of compound (a) and additives per 100 parts by weight of resin.

TABLE 11

| | | Example | | | | | | | | Comparative example | | |
|---|---|---|---|---|---|---|---|---|---|---|---|---|
| | | 105 | 106 | 107 | 108 | 109 | 110 | 111 | 112 | 99 | 100 | 101 |
| Blending substances (parts by weight)* | | | | | | | | | | | | |
| Component (A) | (A)-[III] | 85 | 78 | 65 | 78 | 78 | 78 | 78 | 78 | 78 | 78 | 78 |
| Component (E) | (E)-[I] | 10 | 10 | 10 | 10 | 10 | 10 | 10 | 10 | — | — | — |
| PP | | — | — | — | — | — | — | — | — | 10 | 10 | 10 |
| EPB | | — | — | — | — | — | — | — | — | — | — | — |
| Component (B) | (B)-[I] | 2 | 5 | 10 | 5 | — | — | — | — | 5 | 5 | 5 |
| | (B)-[II] | — | — | — | — | 5 | 5 | — | — | — | — | — |
| | (B)-[III] | — | — | — | — | — | — | 5 | 5 | — | — | — |
| Component | (C)-[I] | 3 | 7 | 15 | — | 7 | — | 7 | — | 7 | 7 | 7 |
| | (C)-[III] | — | — | — | 7 | — | 7 | — | 7 | — | — | — |
| Compound (a) | | 0.1 | 0.1 | 0.1 | 0.1 | 0.1 | 0.1 | 0.1 | 0.1 | 0.1 | — | — |
| Nucleating agent 1 | | — | — | — | — | — | — | — | — | — | 0.1 | — |
| Nucleating agent 2 | | — | — | — | — | — | — | — | — | — | — | 0.1 |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |

TABLE 11-continued

|  | | | | | | | | | | |
|---|---|---|---|---|---|---|---|---|---|---|
| Resistance to impact-whitening | ◎ | ◎ | ◎ | ◎ | ◎ | ◎ | ◎ | ◎ | ◎ | ○ | ○ |
| Percentage of luster (%) | 100 | 98 | 97 | 98 | 97 | 98 | 98 | 98 | 97 | 95 | 97 |
| Izod impact strength (kgf · cm/cm) | 9.0 | 9.4 | 12.3 | 9.5 | 9.6 | 9.5 | 9.7 | 9.6 | 9.6 | 7.9 | 8.6 |
| Tensile strength (kgf/cm$^2$) | 304 | 289 | 261 | 288 | 288 | 287 | 286 | 286 | 279 | 253 | 248 |
| Flexural modulus ×10$^4$ (kgf/cm$^2$) | 1.19 | 1.12 | 0.99 | 1.11 | 1.11 | 1.10 | 1.10 | 1.09 | 1.07 | 0.95 | 0.92 |

|  | | Comparative example | | | | | | | | | |
|---|---|---|---|---|---|---|---|---|---|---|---|
|  | | 102 | 103 | 104 | 105 | 106 | 107 | 108 | 109 | 110 | 111 |
| Blending substances (parts by weight)* | | | | | | | | | | | |
| Component (A) | (A)-[III] | 78 | 85 | 78 | 65 | 78 | 78 | 78 | 90 | 80 | 20 |
| Component (E) | (E)-[I] | — | 10 | 10 | 10 | 10 | 10 | 10 | — | — | — |
| PP | | 10 | — | — | — | — | — | — | — | — | 77 |
| EPB | | — | — | — | — | — | — | — | — | 10 | — |
| Component (B) | (B)-[I] | 5 | 2 | 5 | 10 | 5 | 5 | 5 | — | 10 | — |
|  | (B)-[II] | — | — | — | — | — | — | — | — | — | — |
|  | (B)-[III] | — | — | — | — | — | — | — | — | — | — |
| Component (C) | (C)-[I] | 7 | 3 | 7 | 15 | 7 | 7 | 7 | 10 | — | 3 |
|  | (C)-[III] | — | — | — | — | — | — | — | — | — | — |
| Compound (a) | | — | — | — | — | — | — | — | 0.1 | 0.1 | 0.1 |
| Nucleating agent 1 | | — | — | — | — | 0.1 | — | — | — | — | — |
| Nucleating agent 2 | | — | — | — | — | — | 0.1 | — | — | — | — |
| Nucleating agent 3 | | 0.1 | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 | 0.05 |
| Phosphoric antioxidant 1 | | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 |
| Resistance to impact-whitening | | ○ | ○ | ○ | △ | ○ | ○ | ○ | ○ | X | ○ |
| Percentage of luster (%) | | 97 | 97 | 95 | 95 | 95 | 98 | 97 | 100 | 101 | 99 |
| Izod impact strength (kgf · cm/cm) | | 8.6 | 8.3 | 8.7 | 11.3 | 7.6 | 8.2 | 8.6 | 10.3 | 8.1 | 5.1 |
| Tensile strength (kgf/cm$^2$) | | 266 | 272 | 258 | 232 | 261 | 258 | 275 | 240 | 327 | 310 |
| Flexural modulus ×10$^4$ (kgf/cm$^2$) | | 1.02 | 1.01 | 0.96 | 0.84 | 1.00 | 0.98 | 1.05 | 0.90 | 1.20 | 1.28 |

(Note)
*parts by weight of compound (a) and additives per 100 parts by weight of resin.

TABLE 12

|  | | Example | | | | | | | | Comparative example | | |
|---|---|---|---|---|---|---|---|---|---|---|---|---|
|  | | 113 | 114 | 115 | 116 | 117 | 118 | 119 | 120 | 112 | 113 | 114 |
| Blending substances (parts by weight)* | | | | | | | | | | | | |
| Component (A) | (A)-[IV] | 85 | 78 | 65 | 78 | 78 | 78 | 78 | 78 | 78 | 78 | 78 |
| Component (E) | (E)-[I] | 10 | 10 | 10 | 10 | 10 | 10 | 10 | 10 | — | — | — |
| PP | | — | — | — | — | — | — | — | — | 10 | 10 | 10 |
| EPB | | — | — | — | — | — | — | — | — | — | — | — |
| Component (B) | (B)-[I] | 2 | 5 | 10 | 5 | — | — | — | — | 5 | 5 | 5 |
|  | (B)-[II] | — | — | — | — | 5 | 5 | — | — | — | — | — |
|  | (B)-[III] | — | — | — | — | — | — | 5 | 5 | — | — | — |
| Component (C) | (C)-[I] | 3 | 7 | 15 | — | 7 | — | 7 | — | 7 | 7 | 7 |
|  | (C)-[III] | — | — | — | 7 | — | 7 | — | 7 | — | — | — |
| Compound (a) | | 0.1 | 0.1 | 0.1 | 0.1 | 0.1 | 0.1 | 0.1 | 0.1 | 0.1 | — | — |
| Nucleating agent 1 | | — | — | — | — | — | — | — | — | — | 0.1 | — |
| Nucleating agent 2 | | — | — | — | — | — | — | — | — | — | — | 0.1 |
| Nucleating agent 3 | | — | — | — | — | — | — | — | — | — | — | — |
| Phenolic antioxidant 2 | | 0.05 | 0.05 | 0.05 | 0.05 | 0.05 | 0.05 | 0.05 | 0.05 | 0.05 | 0.05 | 0.05 |
| Phosphoric antioxidant 2 | | 0.05 | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 | 0.1 |
| Resistance to impact-whitening | | ◎ | ◎ | ◎ | ◎ | ◎ | ◎ | ◎ | ◎ | ◎ | ○ | ○ |
| Percentage of luster (%) | | 101 | 99 | 98 | 98 | 98 | 98 | 99 | 99 | 98 | 94 | 102 |
| Izod impact strength (kgf · cm/cm) | | 11.3 | 11.8 | 15.4 | 11.9 | 11.8 | 11.9 | 12.2 | 12.1 | 12.1 | 9.6 | 10.6 |
| Tensile strength (kgf/cm$^2$) | | 262 | 249 | 225 | 248 | 247 | 246 | 245 | 246 | 241 | 208 | 211 |
| Flexural modulus ×10$^4$ (kgf/cm$^2$) | | 0.86 | 0.81 | 0.71 | 0.80 | 0.80 | 0.80 | 0.80 | 0.79 | 0.77 | 0.69 | 0.68 |

|  | | Comparative example | | | | | | | | | |
|---|---|---|---|---|---|---|---|---|---|---|---|
|  | | 115 | 116 | 117 | 118 | 119 | 120 | 121 | 122 | 123 | 124 |
| Blending substances (parts by weight)* | | | | | | | | | | | |
| Component (A) | (A)-[IV] | 78 | 85 | 78 | 65 | 78 | 78 | 78 | 90 | 80 | 20 |
| Component (E) | (E)-[I] | — | 10 | 10 | 10 | 10 | 10 | 10 | — | — | — |

TABLE 12-continued

| (E) | | | | | | | | | | | |
|---|---|---|---|---|---|---|---|---|---|---|---|
| PP | | 10 | — | — | — | — | — | — | — | — | 77 |
| EPB | | — | — | — | — | — | — | — | — | 10 | — |
| Component (B) | (B)-[I] | 5 | 2 | 5 | 10 | 5 | 5 | 5 | — | 10 | — |
| | (B)-[II] | — | — | — | — | — | — | — | — | — | — |
| | (B)-[III] | — | — | — | — | — | — | — | — | — | — |
| Component (C) | (C)-[I] | 7 | 3 | 7 | 15 | 7 | 7 | 7 | 10 | — | 3 |
| | (C)-[III] | — | — | — | — | — | — | — | — | — | — |
| Compound (a) | | — | — | — | — | — | — | — | 0.1 | 0.1 | 0.1 |
| Nucleating agent 1 | | — | — | — | — | 0.1 | — | — | — | — | — |
| Nucleating agent 2 | | — | — | — | — | — | 0.1 | — | — | — | — |
| Nucleating agent 3 | | 0.1 | — | — | — | — | — | 0.1 | — | — | — |
| Phenolic antioxidant 2 | | 0.05 | 0.05 | 0.05 | 0.05 | 0.05 | 0.05 | 0.05 | 0.05 | 0.05 | 0.05 |
| Phosphoric antioxidant 2 | | 0.05 | 0.05 | 0.05 | 0.05 | 0.05 | 0.05 | 0.05 | 0.05 | 0.05 | 0.05 |
| Ca—St | | 0.1 | 0.1 | 0.1 | 0.1 | 0.1 | 0.1 | 0.1 | 0.1 | 0.1 | 0.1 |
| Resistance to impact-whitening | | O | O | O | Δ | O | O | O | O | X | O |
| Percentage of luster (%) | | 98 | 99 | 97 | 97 | 95 | 102 | 99 | 101 | 102 | 99 |
| Izod impact strength (kgf·cm/cm) | | 10.9 | 10.1 | 10.6 | 13.8 | 9.3 | 10.2 | 10.9 | 12.9 | 10.2 | 5.3 |
| Tensile strength (kgf/cm$^2$) | | 223 | 223 | 212 | 191 | 215 | 219 | 230 | 207 | 282 | 308 |
| Flexural modulus ×10$^4$ (kgf/cm$^2$) | | 0.74 | 0.73 | 0.69 | 0.61 | 0.72 | 0.73 | 0.76 | 0.65 | 0.91 | 1.24 |

(Note)
*parts by weight of compound (a) and additives per 100 parts by weight of resin.

Examples and Comparative examples described in Table 1 are directed to the cases where a crystalline ethylene-propylene random copolymer is used as component (A) and other components described in Table 1 are used. As seen from Table 1, Examples 1 to 11 are directed to the cases where components (A), (B) and (C) within the ranges of blending proportions of the present invention are blended with compound (a). When Examples 1 to 3 are compared with Comparative examples 1 to 3 wherein components (A), (B) and (C) within the ranges of blending proportions of the present invention are used, but no nucleating agent is used, it is seen that the values of the impact resistance and resistance to impact-whitening of the Examples are almost the same as those of the Comparative examples, but the luster, mechanical strength and stiffness of Comparative examples 1 to 3 are inferior to those of Examples 1 to 3. Further, when Comparative examples 4 to 6 wherein nucleating agents consisting of compounds other than compound (a) are blended with components (A), (B) and (C) of which the blending proportions are within the ranges of those of the present invention, are compared with Examples 1 to 3, the effectiveness of improvements in the luster, mechanical strength and stiffness of Comparative examples 4 to 6 is not sufficient, whereas Examples 1 to 3 are far superior in the mechanical strength and stiffness; hence use of compound (a) exhibits a notable synergistic effect. Thus, the mechanical strength and stiffness obtained in the present invention can be said to be specific effects observed when compound (a) is blended with components (A), (B) and (C) of which the blending proportions are within the ranges of those of the present invention.

Further, when Comparative examples 7 to 9 using a polyolefin composition disclosed in the above Japanese patent application laid-open No. Sho 61-103944/1986 i.e. a blend obtained by blending a sodium organic phosphate i.e. compound (a) with component (A) of which the blending proportion is outside the range of that of the present invention and one or two kinds selected from among component (B), component (C) and EPB, are compared with Examples 1 to 3, it is seen that Comparative examples 7 to 9 are inferior in the aspect of at least one of the resistance to impact-whitening, luster, impact resistance, mechanical strength and stiffness, whereas Examples 1 to 3 are superior in the aspect of the whole thereof. Further, in the cases of Examples 4 to 11 where components (B) and (C) used in Examples 1 to 3 are replaced, respectively, too, it is seen that the same effectiveness as in Examples 1 to 3 is obtained.

Tables 2 to 4 are directed to the cases where a crystalline ethylene-propylene random copolymer or a crystalline ethylene-propylene-butene-1 random copolymer is used as component (A). In these cases, too, the same effectiveness as above has been confirmed.

Examples and Comparative examples described in Table 5 are directed to the cases where a crystalline ethylene-propylene random copolymer is used as component (A) and other components indicated in Table 5, respectively are used. As seen from Table 5, Examples 45 to 55 are directed to the cases where compound (a) is blended with components (A), (B), (C) and (D) of which the blending proportions are within the ranges of those of the present invention. When Examples 45 to 47 are compared with Comparative examples 37 to 39 wherein no nucleating agent is used together with components (A), (B), (C) and (D) of which the blending proportions are within the ranges of those of the present invention, it is seen that the values of the impact resistance and resistance to impact-whitening of the Comparative examples are similar to those of the Examples, but the values of the mechanical strength and stiffness of Comparative examples 37 to 39 are inferior to those of Examples 45 to 47. Further, when Comparative examples 40 to 42 wherein nucleating agents consisting of compounds other than compound (a) are blended with components (A), (B), (C) and (D) of which the blending proportions are within the ranges of those of the present invention are compared with Examples 45 to 47, it is seen that the effectiveness of improvements in the luster, mechanical strength and stiffness of Comparative examples 40 to 42 are not sufficient, whereas Examples 45 to 47 are far superior in the mechanical strength and stiffness; hence use of compound (a) exhibits a notable synergistic effect. Thus, the mechanical strength and stiffness obtained in the present invention can be said to be specific effects observed when compound (a) is used together with components (A), (B), (C) and (D) of which the blending proportions are within limited ranges of those of the present invention. Further, when Comparative examples 43 to 45 wherein a polyolefin composition disclosed in the above Japanese patent application laid-open No. Sho 61-103944/1986 i.e. a blend obtained by blending a sodium organic phosphate i.e. compound (a) with one or two kinds selected from among component (A) of which the blending proportion is outside the ranges of those of the present invention, components (B), (C) and (D) and EPB are compared with Examples 45 to 47, it is seen that Comparative examples 43 to 45 are inferior in the aspect of at least one of the resistance to impact-whitening, luster, impact resistance, mechanical strength and stiffness, whereas Examples 45 to 47 are superior in all the aspects thereof.

Further, in Examples 48 to 55 wherein components (B) and (C) used in Examples 45 to 47 are replaced, respectively, too, it is seen that the same effectiveness as in Examples 45 to 47 is obtained.

Tables 6 to 8 are directed to the cases where a crystalline ethylene-propylene random copolymer or a crystalline ethylene-propylene-butene-1 random copolymer is used as component (A), and in these cases, too, the same effectiveness as above has been confirmed.

Examples and Comparative examples described in Table 9 are directed to the cases where a crystalline ethylene-propylene random copolymer is used as component (A) and other components indicated in Table 9 are used. As seen from Table 9, Examples 89 to 96 are directed to the cases where compound (a) is blended with components (A), (B), (C) and (E) of which the blending proportions are within the ranges of those of the present invention. When Examples 89 to 91 are compared with Comparative examples 73 to 76 wherein compound (a) or a nucleating agent other than compound (a) is blended with a propylene homopolymer having an isotactic pentad ratio outside the range of those of the present invention i.e. PP, used in place of component (E), it is seen that the values of the impact resistance and resistance of impact-whitening of the Comparative examples are similar to those of the Examples, but Comparative examples 73 to 76 are inferior in the mechanical strength and stiffness to Examples 89 to 91. Further, when Comparative examples 79 to 81 wherein no nucleating agent is used together with components (A), (B), (C) and (E) of which the blending proportions are within the ranges of those of the present invention are compared with Examples 89 to 91, it is seen that the luster, mechanical strength and stiffness of Comparative examples 77 to 79 are not yet sufficient. Further, when Comparative examples 80 to 82 wherein a nucleating agent other than compound (a) is blended with components (A), (B), (C) and (E) of which the blending proportions are within the ranges of those of the present invention are compared with Examples 89 to 91, it is seen that the effectiveness of improvements in the luster, mechanical strength and stiffness is considerably observed, but not yet sufficient, whereas Examples 89 to 91 are notably superior in the mechanical strength and stiffness; hence use of compound (a) exhibits a remarkable synergistic effect. Thus, the mechanical strength and stiffness obtained in the present invention can be said to be specific effects observed when compound (a) is used together with components (A), (B), (C) and (E) of which the blending proportions are within the ranges of those of the present invention. Further, when Comparative examples 83 to 85 wherein a sodium organic phosphate i.e. compound (a) is blended with a polyolefin composition disclosed in the above Japanese patent application laid-open No. Sho 61-103944/1986 i.e. component (A) of which the blending proportion is outside the range of those of the present invention, and one or two kinds selected from among components (B) and (C), PP and EPB, are compared with Examples 89 to 91, it is seen that Comparative examples 83 to 85 are inferior in at least one of resistance to impact-whitening, luster, impact resistance, mechanical strength and stiffness, whereas Examples 89 to 91 are far superior in all the aspects thereof, particularly superior in the mechanical strength and stiffness. Further, it is seen that in Examples 92 to 96 wherein components (B) and (C) used in Examples 89 to 91 are replaced, respectively, too, the same effectiveness is obtained.

Tables 10 to 12 are directed to the cases where a crystalline ethylene-propylene random copolymer or a crystalline ethylene-propylene-butene-1 random copolymer is used as component (A), and in these cases, too, the same effectiveness as above has been confirmed.

From the foregoing, it has been evidenced that the composition of the present invention is superior in the resistance to impact-whitening, luster, impact resistance, mechanical strength and stiffness, particularly and far superior in the mechanical strength and stiffness, as compared with compositions having so far known nucleating agents blended therein; thus the notable effectiveness of the composition of the present invention has been confirmed.

What we claim is:

1. A polyolefin composition comprising
   (A) 65 to 98 parts by weight of a crystalline α-olefin-propylene random copolymer, (B) 1 to 15 parts by weight of a high density ethylene polymer and (C) 1 to 20 parts by weight of a non-crystalline ethylene-propylene random copolymer or a non-crystalline ethylene-propylene-non-conjugated diene random copolymer, the total weight of the components (A), (B) and (C) being 100 parts by weight,
   having blended with said components (A), (B) and (C), 0.01 to 1 part by weight of a phosphate compound expressed by the following formula (I) (abbreviated to compound (a)):

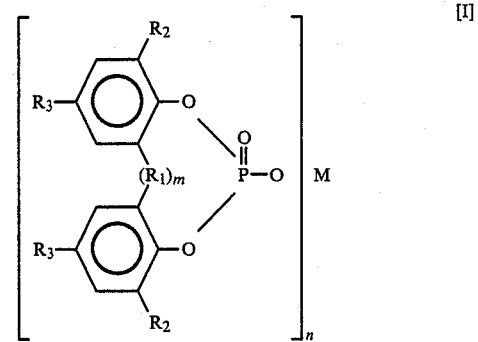

wherein $R_1$ represents sulfur or an alkylidene group of 1 to 4 carbon atoms; $R_2$ and $R_3$ each represent a hydrogen atom or the same or different alkyl groups of 1 to 8 carbon atoms; M represents a monovalent, divalent or trivalent metal atom; m represents 0 or 1; and n represents an integer of 1 to 3.

2. A polyolefin composition according to claim 1 wherein said $R_1$ represents methylene group and said $R_2$ and $R_3$ each represents a t-butyl group.

3. A polyolefin composition according to claim 1 wherein said compound (a) represents sodium 2,2'-methylene-bis(4,6-di-t-butylphenyl)phosphate.

4. A polyolefin composition comprising
(A) 35 to 97 parts by weight of a crystalline α-olefin-propylene random copolymer, (D) 1 to 30 parts by weight of a propylene homopolymer, (B) 1 to 15 parts by weight of a high density ethylene polymer and (C) 1 to 20 parts by weight of a non-crystalline ethylenepropylene random copolymer or a non-crystalline ethylene-propylene-non-conjugated diene random copolymer, the total weight of the components (A), (D), (B) and (C) being 100 parts by weight, having blended with said components (A), (D), (B) and (C), 0.01 to 1 part by weight of a compound (a) set forth in claim 1.

5. A polyolefin composition according to claim 4 wherein said $R_1$ represents methylene group and said $R_2$ and $R_3$ each represents a t-butyl group.

6. A polyolefin composition according to claim 4 wherein said compound (a) represents sodium 2,2'-methylene-bis(4,6-di-t-butylphenyl)phosphate.

7. A polyolefin composition comprising
(A) 35 to 97 parts by weight of a crystalline α-olefin-propylene random copolymer, (E) 1 to 30 parts by weight of a crystalline propylene homopolymer having a relation between an isotactic pentad ratio (P) and a melt flow rate (MFR: a quantity of molten resin extruded at 230° C. under a load of 2.16 Kg and for 10 minutes), of $1.00 \geq P \geq 0.015 \log MFR + 0.955$, (B) 1 to 15 parts by weight of a high density ethylene polymer and (C) 1 to 20 parts by weight of a non-crystalline ethylene-propylene random copolymer or a non-crystalline ethylene-propylene-non-conjugated diene copolymer, the total weight of the components (A), (E), (B) and (C) being 100 parts by weight, having blended with said components (A), (E), (B) and (C), 0.01 to 1 part by weight of a compound (a) set forth in claim 1.

8. A polyolefin composition according to claim 7 wherein said $R_1$ represents methylene group and said $R_2$ and $R_3$ each represents a t-butyl group.

9. A polyolefin composition according to claim 7 wherein said compound (a) represents sodium 2,2'-methylene-bis(4,6-di-t-butylphenyl)phosphate.

* * * * *